(12) United States Patent
Lantz

(10) Patent No.: US 8,763,811 B2
(45) Date of Patent: Jul. 1, 2014

(54) INSULATED SHIPPING CONTAINER, AND METHOD OF MAKING

(76) Inventor: Gary Lantz, Lake Forest, CA (US)

( * ) Notice: Subject to any disclaimer, the term of this patent is extended or adjusted under 35 U.S.C. 154(b) by 404 days.

(21) Appl. No.: 13/068,212

(22) Filed: May 5, 2011

(65) Prior Publication Data

US 2012/0279896 A1 Nov. 8, 2012

(51) Int. Cl.
*B65D 81/02* (2006.01)
(52) U.S. Cl.
USPC ................ 206/584; 206/594; 229/103.11
(58) Field of Classification Search
USPC ............ 206/584, 591, 592, 593, 594; 62/60, 62/371, 372; 229/103.11
See application file for complete search history.

(56) References Cited

U.S. PATENT DOCUMENTS

| | | | | |
|---|---|---|---|---|
| 5,351,830 A | * | 10/1994 | Bender et al. | 206/524.8 |
| 5,515,975 A | * | 5/1996 | Jarvis et al. | 206/584 |
| 6,085,909 A | * | 7/2000 | Lyons | 206/584 |
| 6,325,281 B1 | * | 12/2001 | Grogan | 229/103.11 |
| 6,910,582 B2 | * | 6/2005 | Lantz | 206/593 |
| 7,452,316 B2 | * | 11/2008 | Cals et al. | 493/95 |
| 8,011,511 B2 | * | 9/2011 | Oyler et al. | 206/523 |
| 2008/0203090 A1 | * | 8/2008 | Dickinson | 220/1.5 |
| 2008/0289302 A1 | * | 11/2008 | Vulpitta | 53/472 |
| 2011/0100868 A1 | * | 5/2011 | Lantz | 206/584 |

\* cited by examiner

*Primary Examiner* — Jacob K Ackun
(74) *Attorney, Agent, or Firm* — Terry L. Miller

(57) ABSTRACT

An improved shock absorbing insulated shipping container including an external corrugated cardboard box, receiving a product box therein. Peripheral spaced, and upper and lower spaced between the external box and the product box receive insulating pellets, which are maintained under a compressive force in order to interlock these insulating pellets and prevent their migration during transit of the shipping container. By preventing migration of the insulating pellets, the formation of a void (or voids) in the insulation of the container is prevented, and the formation of a hot spot (or hot spots) within the container which could degrade or damage the product in transit is prevented. A most preferred embodiment utilized insulating pellets made of puffed vegetable starch, so that substantially the entire container can be recycled, is biodegradable, or can be composted.

9 Claims, 15 Drawing Sheets

INSULATED SHIPPING CONTAINER, AND METHOD OF MAKING

BACKGROUND OF THE INVENTION

1. Field of the Invention

The present invention relates to an improved insulated shipping container; with all or substantially all of the component parts of this container suitable for recycling (or which are biodegradable or can be composted). Thus, a shipping container according to this invention may be considered environmentally friendly, or "green." More particularly, this invention relates to an insulated shipping container having provision for preventing migration or stratification of particulate insulating material and thus preventing development of "hot spots" where ambient heat could reach the contents being shipped were the particulate insulation allowed to shift during shipping.

In order to protect item(s) being shipped, the present container is especially configured and constructed to provide both shock absorption, to provide temperature regulation through the use of a combination of particulate insulation (i.e., insulation pellets) and a temperature control material, such as refrigerated gel packs or dry ice. Also, the present container is configured to prevent voids or gaps from forming in the particulate insulation material, which gaps would lead to localized "hot spots" and could result in damage to or degradation of temperature sensitive cargo during transit.

2. Related Technology

Traditionally, containers for shipping temperature sensitive products have generally included conventional cardboard shipping containers having an insulating material therein. The insulating material may be simple loose-fill Styrofoam "peanuts," for example, in which a chunk of dry ice is placed along with the material to be shipped. Another variety of conventional insulated shipping container utilized panels or containers made of an insulating material, such as expanded polystyrene (EPS). EPS is a relatively inexpensive insulating material, and it may be easily formed into a desired shape, has acceptable thermal insulating properties for many shipping needs, and may be encapsulated or faced with protective Materials, such as plastic film or metal foil, or plastic film/metal foil laminates.

Containers including EPS are often provided in a modular form. Individual panels of EPS insulation, possibly wrapped in foil or the like, are preformed using conventional methods, typically with beveled, mitered, or square (i.e., 90°) edges. The panels are then inserted into a conventional cardboard box type of shipping container, one panel against the floor wall, and against each side wall, to create an insulated cavity within the container. In this arrangement, the beveled edges of adjacent panels form seams at the corners of the container. A product is placed in the cavity and a plug, such as a thick polyether or polyester foam pad, is placed over the top of the product before the container is closed and prepared for shipping. In many cases, a coolant, such as packaged ice, gel packs, or loose dry ice, is placed around the product in the cavity to refrigerate the product during shipping.

Alternatively, an insulated body may be injection molded from expanded polystyrene, forming a cavity therein and having an open top to access the cavity. A product is placed in the cavity, typically along with coolant, and a cover is placed over the open end, such as the foam plug described above or a cover formed from EPS.

For shipping particularly sensitive products, such as certain medical or pharmaceutical products, expanded rigid polyurethane containers are often used, as expanded polyurethane has thermal properties generally superior to EPS. Typically, a cardboard container is provided having a box liner therein, defining a desired insulation space between the liner and the container. Polyurethane foam is injected into the insulation space, substantially filling the space and generally adhering to the container and the liner. The interior of the box liner provides a cavity into which a product and coolant may be placed. A foam plug may be placed over the product, or a lid may be formed from expanded polyurethane, typically having a flat or possibly an inverted top-hat shape.

With all of the conventional shipping containers outlined above, many of the component parts of the container are not biodegradable, and recycling of the materials of the container is also problematic. Some countries, particularly the European countries, impose a tariff or tax on products that do not meet recycling guidelines. Many conventional insulated shipping containers do not meet these recycling guidelines, so that the costs of using such non-compliant containers is increased by the applied additional taxes. Particularly, insulated shipping containers of the type utilizing polyurethane foam injected into a space between an inner and an outer nested cardboard boxes create a particularly difficult disposal problem. When polyurethane is injected into such a container, it generally adheres substantially to the walls of both the inner and the outer cardboard box. Thus, the cardboard and insulation components may have to be disposed of together, entirely preventing recycling of the container.

Accordingly, there is a need for an improved insulated shipping container which is "green" with substantially all of the components of the container being either biodegradable, or recyclable, or both.

SUMMARY OF THE INVENTION

The present invention is directed generally to an improved insulated shipping container for shipping a temperature sensitive product in a temperature regulated condition, which container is entirely recyclable or biodegradable. Further, the container is to provide physical protection from shocks and bumps as commonly occur during transport on common carriers, such as truck freight and air freight carriers.

One aspect of the present invention provides an improved insulating and cushioning shipping container, the shipping container comprising an exterior box defining a floor wall and plural side walls cooperatively defining a cavity there within and an opening to the cavity, and means for closing the opening; an insulating and cushioning pillow or pad member received into the cavity, the pillow including an air permeable flexible casing having size and shape including a thickness, and a mass of insulating material of pellet form received into the casing; and cooperating wall structure receiving the pillow therebetween and sandwiching the pillow for applying a selected compressive stress and strain to the insulating material within the pillow in a direction parallel to the thickness thereof, as well as applying a compressive stress to the pillow along the length or width thereof, whereby pellets of the pellet insulating material are mutually interlocked with one another so as to inhibited migration of the pellets during transit of the shipping container. The pillow and sandwiching walls bound a cavity or void space within the shipping container for receiving an item to be shipped.

According to another aspect, the present invention provides a method of providing an improved insulating and cushioning shipping container, the method comprising steps of: providing an exterior box defining a floor wall and plural side walls cooperatively defining a cavity there within, and an opening to the cavity, and means for closing the opening;

providing an insulating and cushioning pillow member; providing the pillow member with an air permeable flexible casing, sheath, or enclosure having a size and shape including a thickness, and within the pillow member providing a mass of insulating material of pellet form; providing a wall structure including a pair of cooperating walls receiving the pillow member and sandwiching the pillow member therebetween, and utilizing the wall structure to apply a selected compressive stress and strain to the insulating material within the pillow member; and employing the selected compressive stress and strain to mutually interlock the mass of insulating pellets within the pillow member so as to inhibited migration of the pellets during transit of the shipping container, while providing a cavity or void space within the shipping container for receiving an item to be shipped.

Other objects and features of the present invention will become apparent from consideration of the following description taken in conjunction with the accompanying drawings.

BRIEF DESCRIPTION OF THE DRAWING FIGURES

Figure 1:
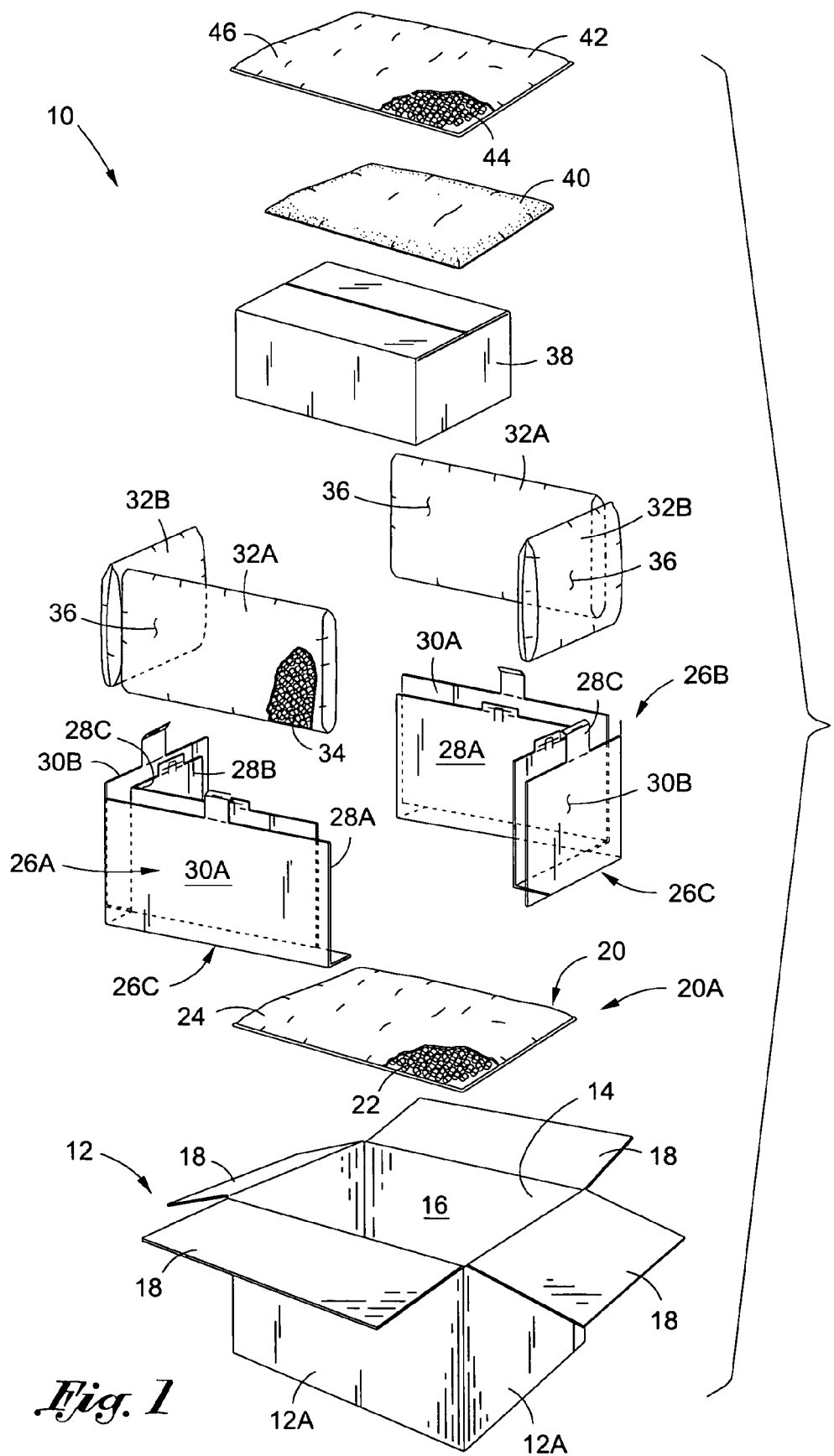
FIG. 1 is an exploded perspective view of an insulated shipping container according to the invention.
Figure 2A:
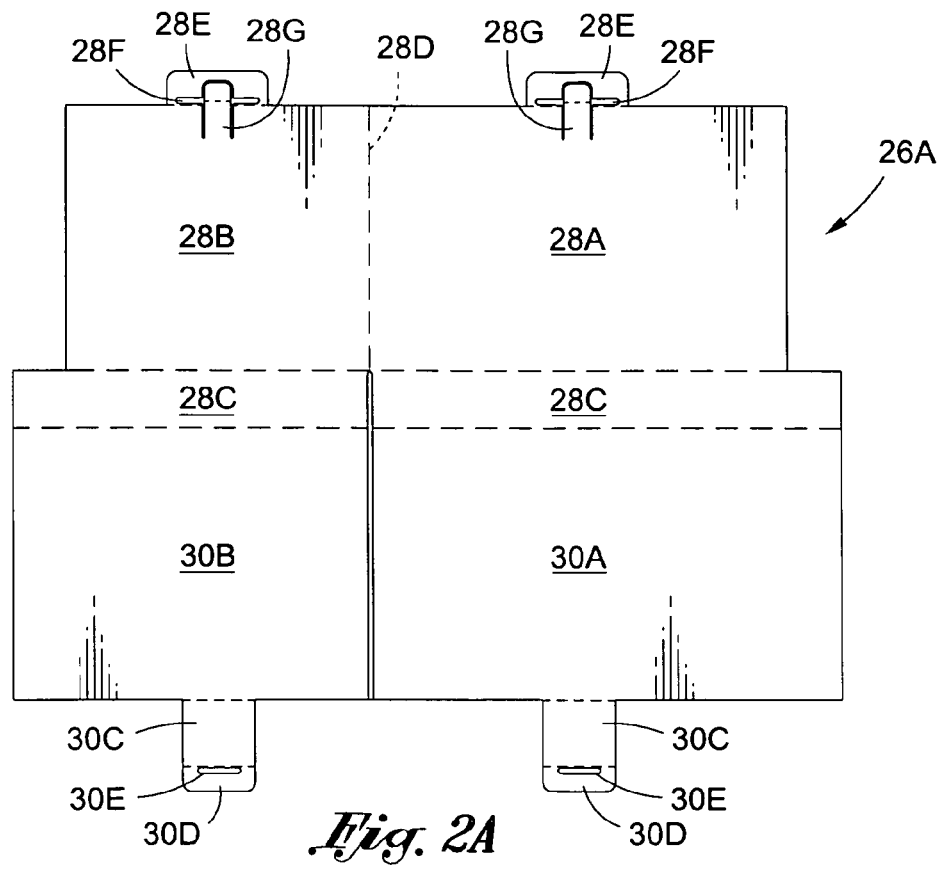
FIGS. 2A and 2B are respective plan views of component parts of the container generally as seen in FIG. 1, and are seen at a first stage of manufacture before being placed into the configuration seen in FIG. 1, and including additional features advantageous to ease assembly of the container.
Figure 2B:
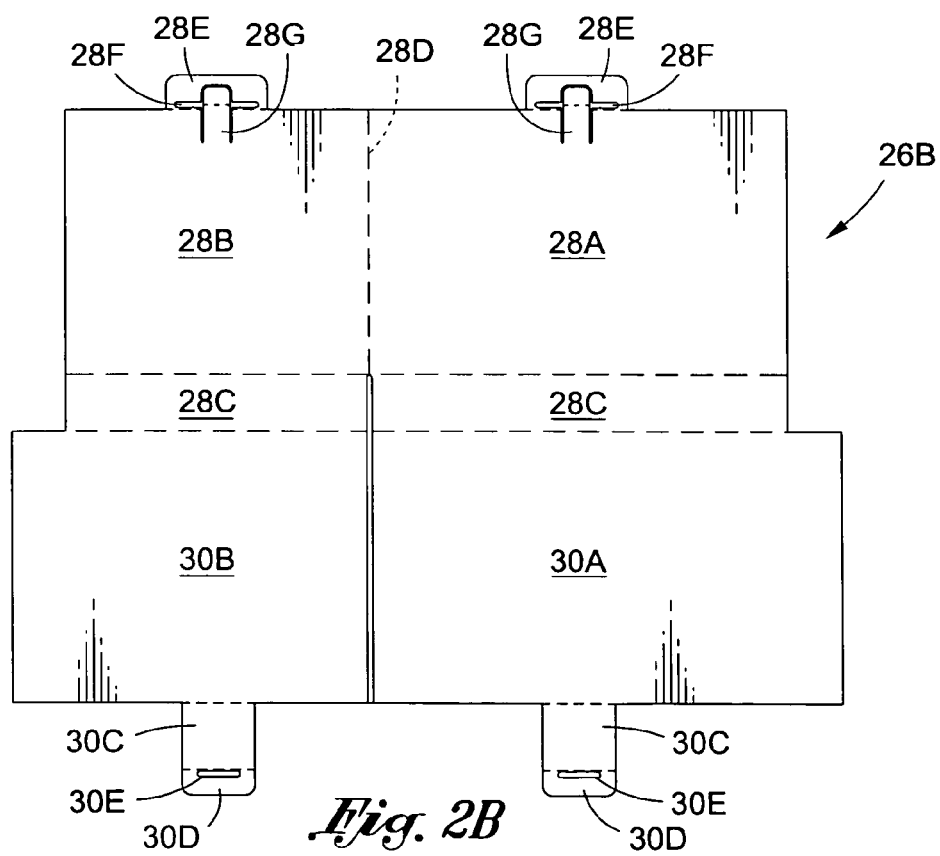
Figure 2C:
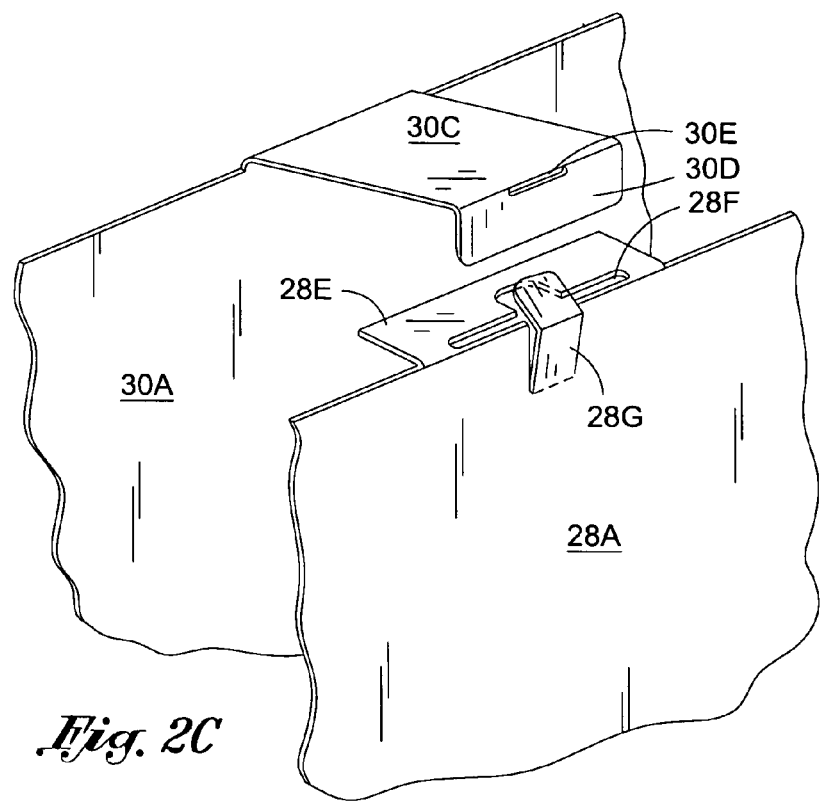
Figure 3:
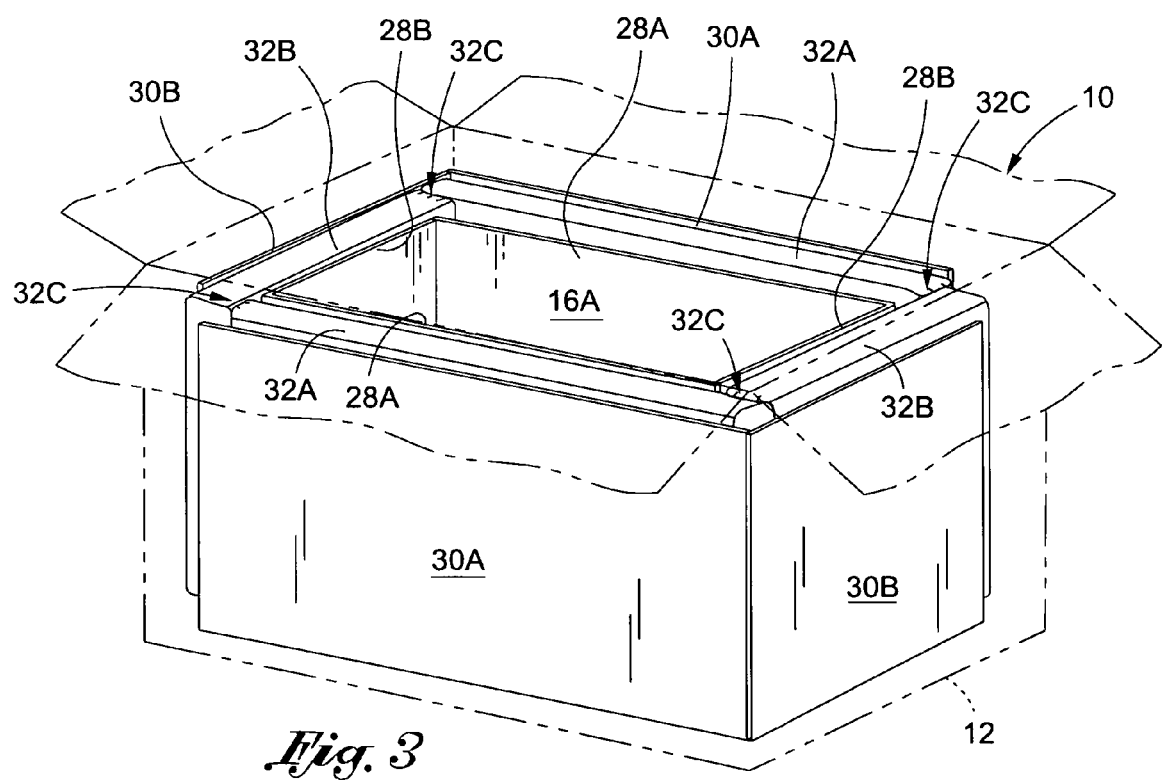
Figure 4:
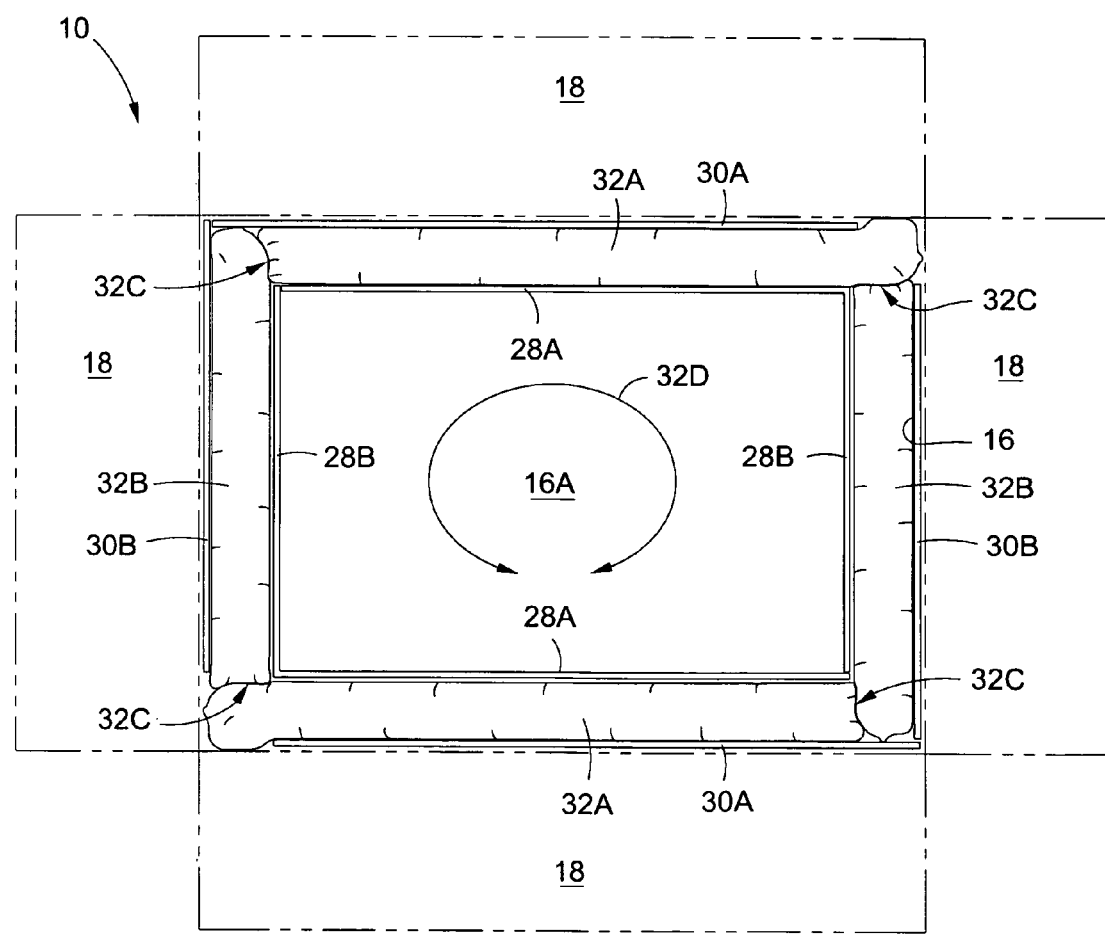
Figure 5:
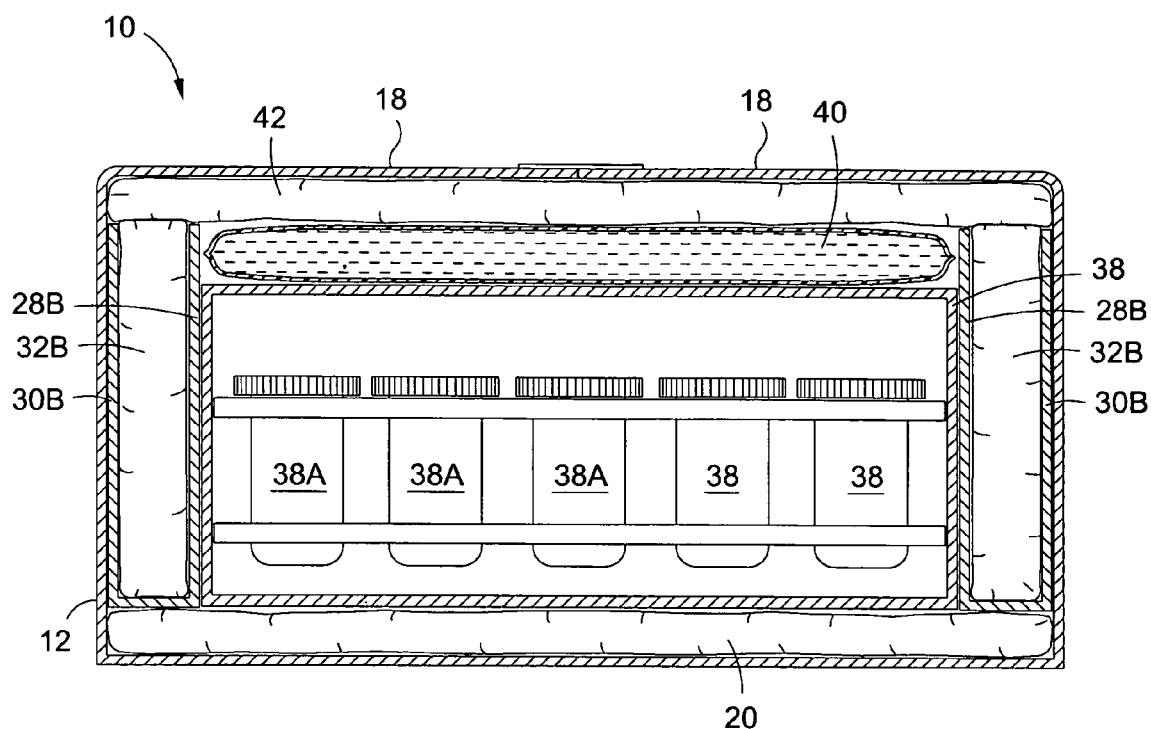
Figure 6:
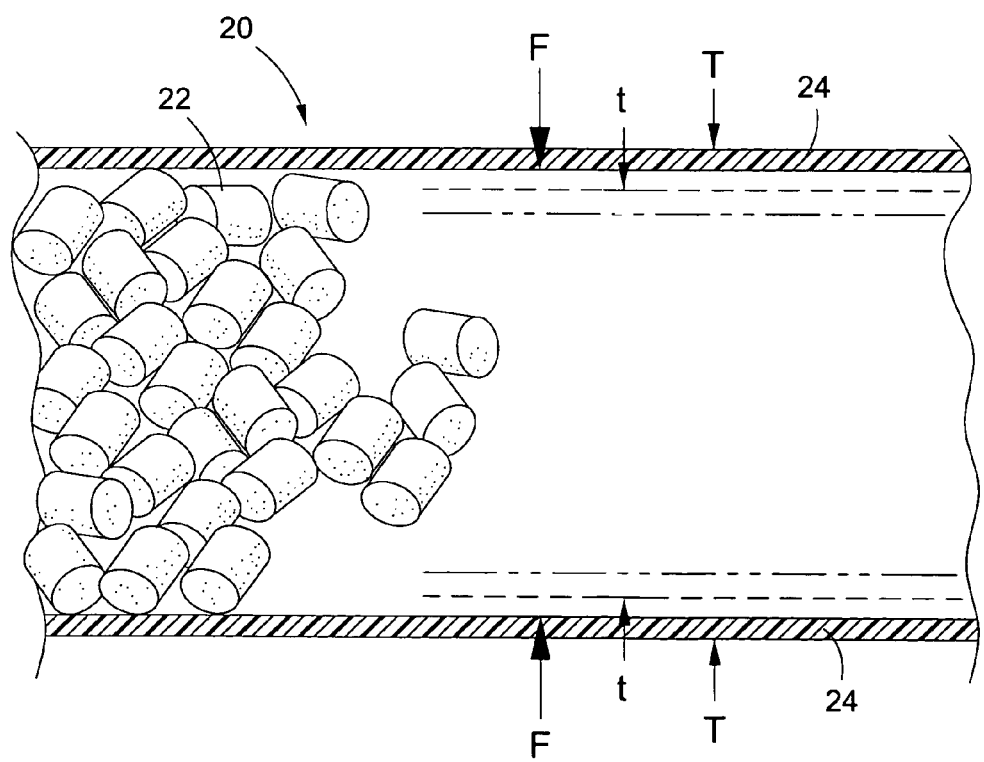

FIG. 2C provides a perspective view of how additional features of the component parts seen in FIGS. 2A and 2B interconnect with one another in order to ease assembly of the container;

FIG. 3 is a perspective elevation view of a container as seen in FIG. 1 at a second stage of packing the container;

FIG. 4 is a plan view of a container as seen in FIGS. 1 and 3;

FIG. 5 is an elevation view, partly in cross section, of a container as seen in FIGS. 1, 3, and 4, and is shown packed and closed preparatory to shipping;

FIG. 6 provides a partially cross sectional view of a component part used in the insulated shipping container of the present invention.

Figure 7:
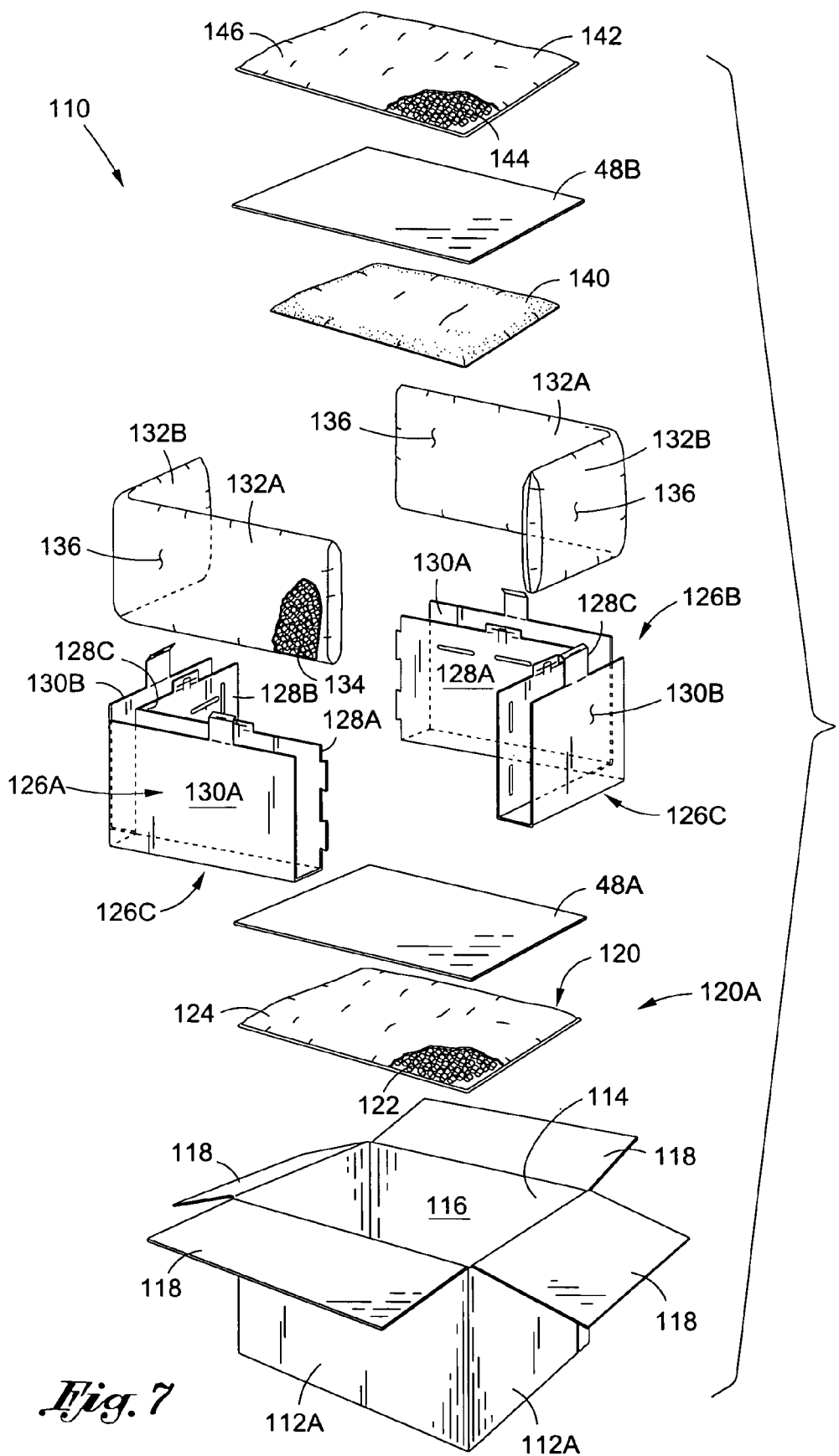
Figure 8:
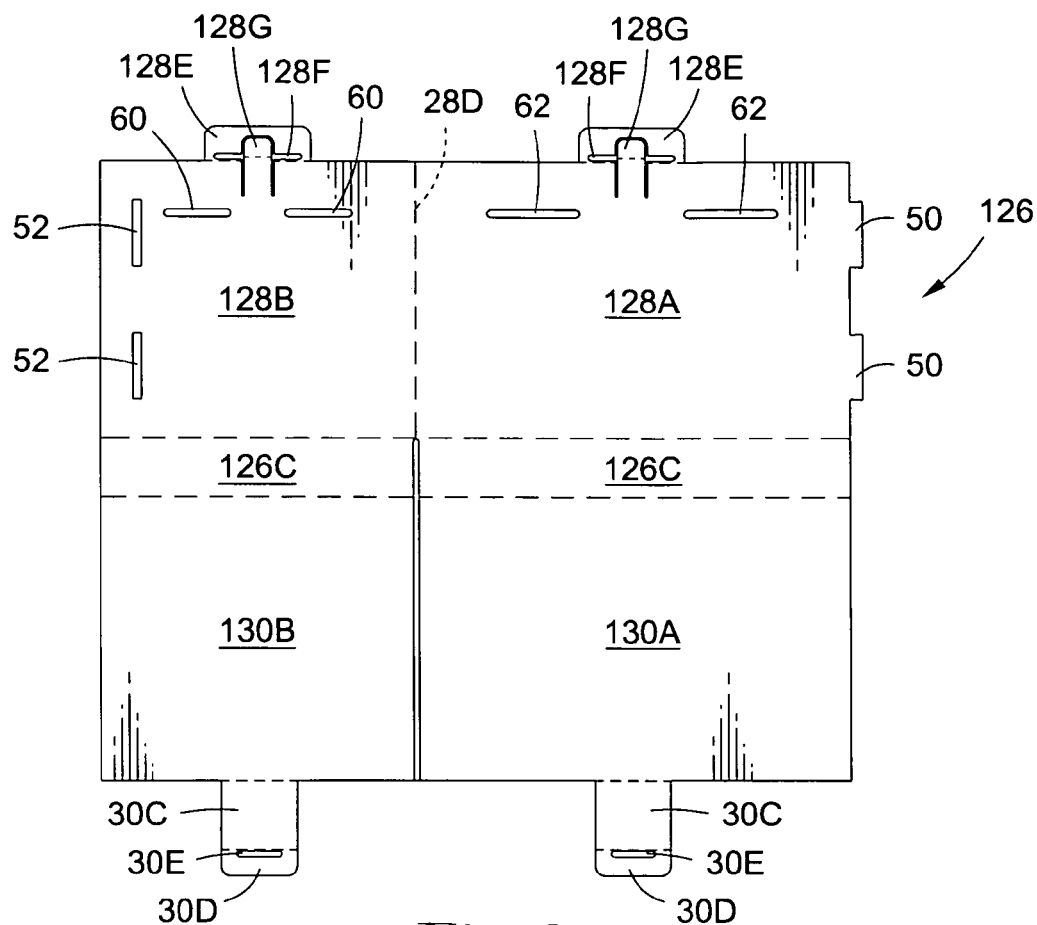
Figure 8A:
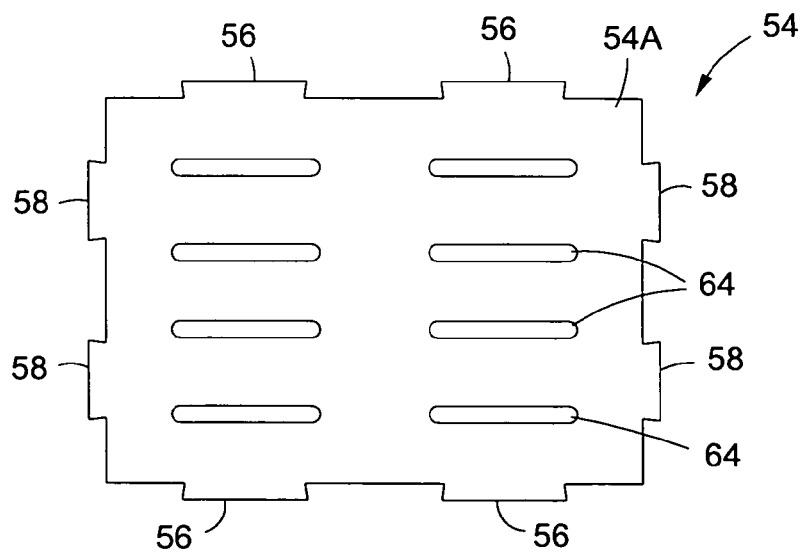
Figure 9:
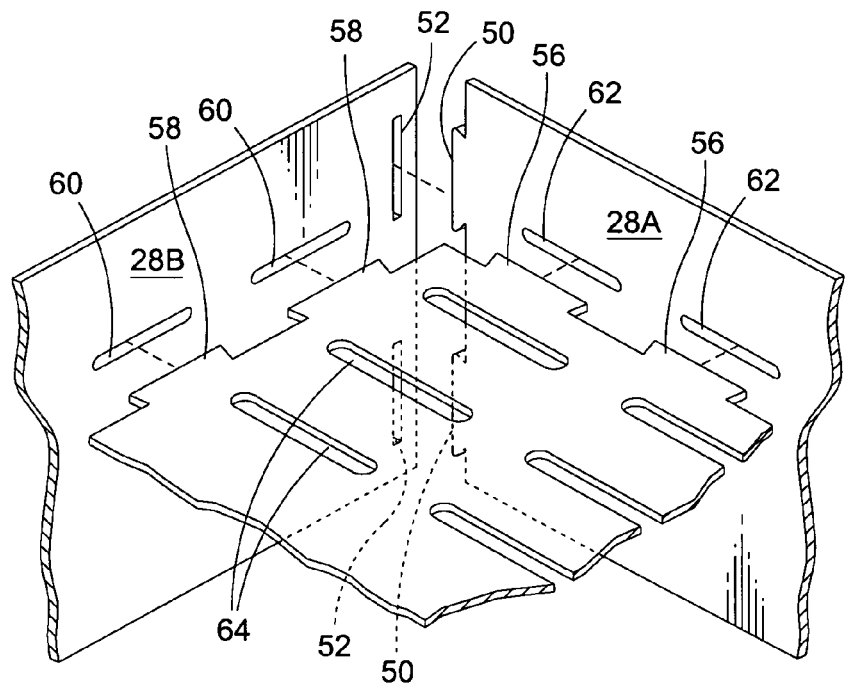
Figure 10:
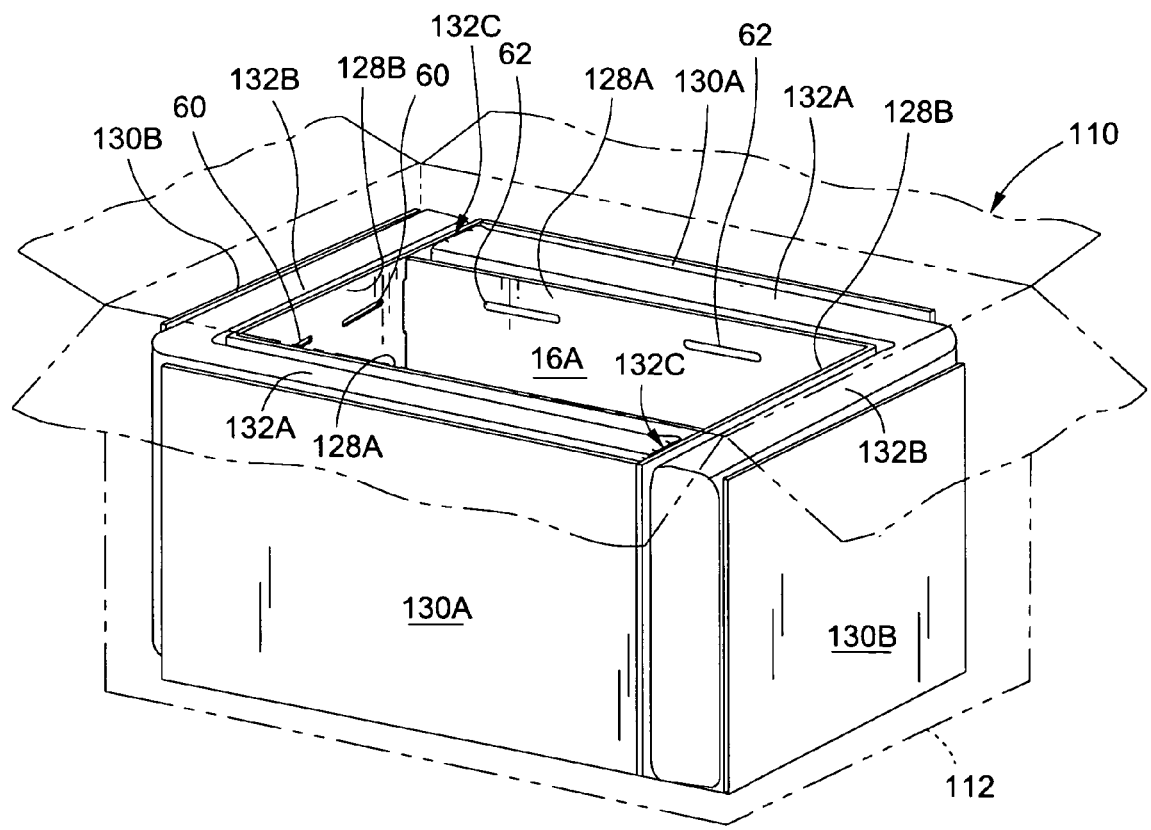
Figure 11:
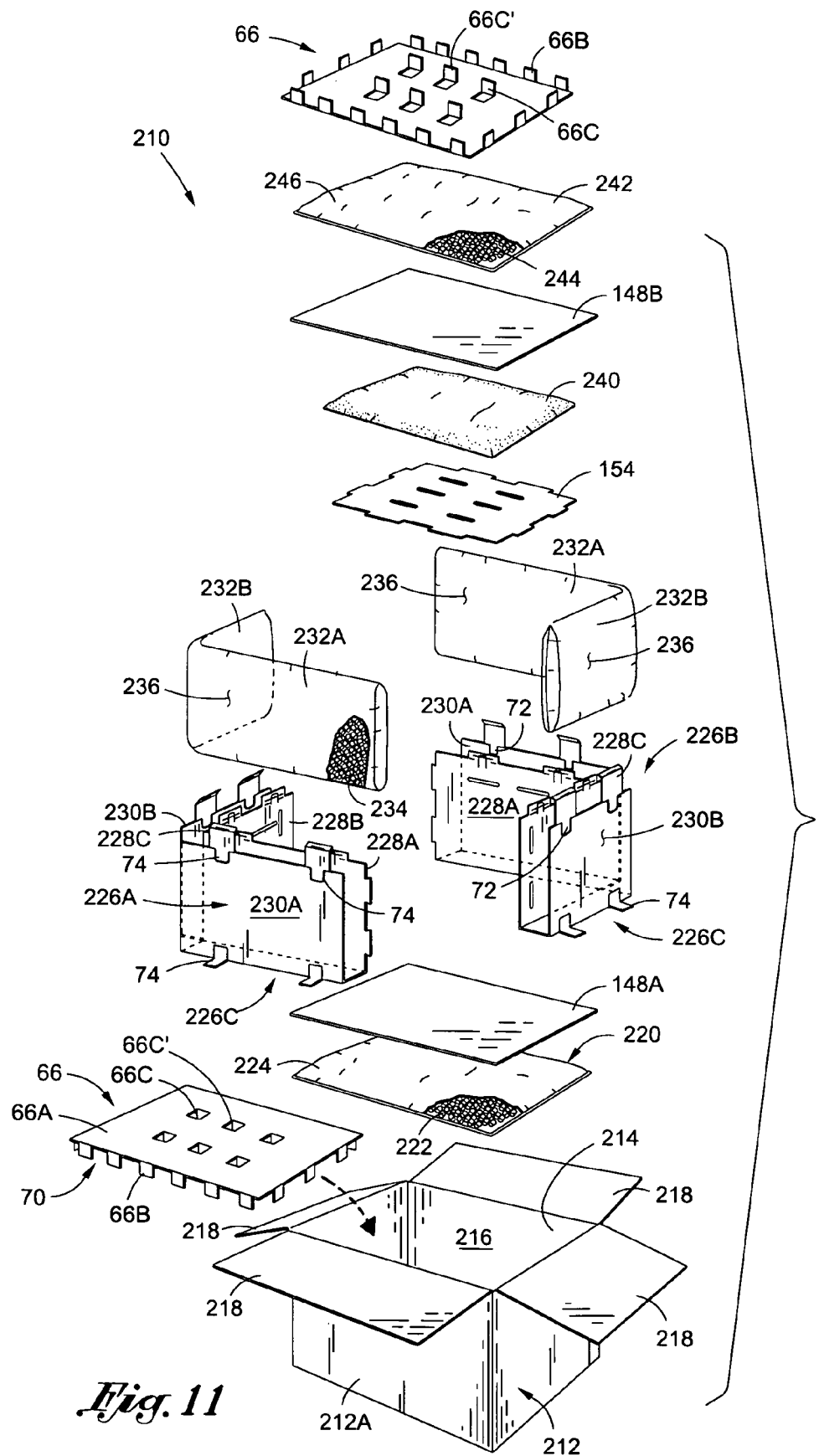
Figure 12:
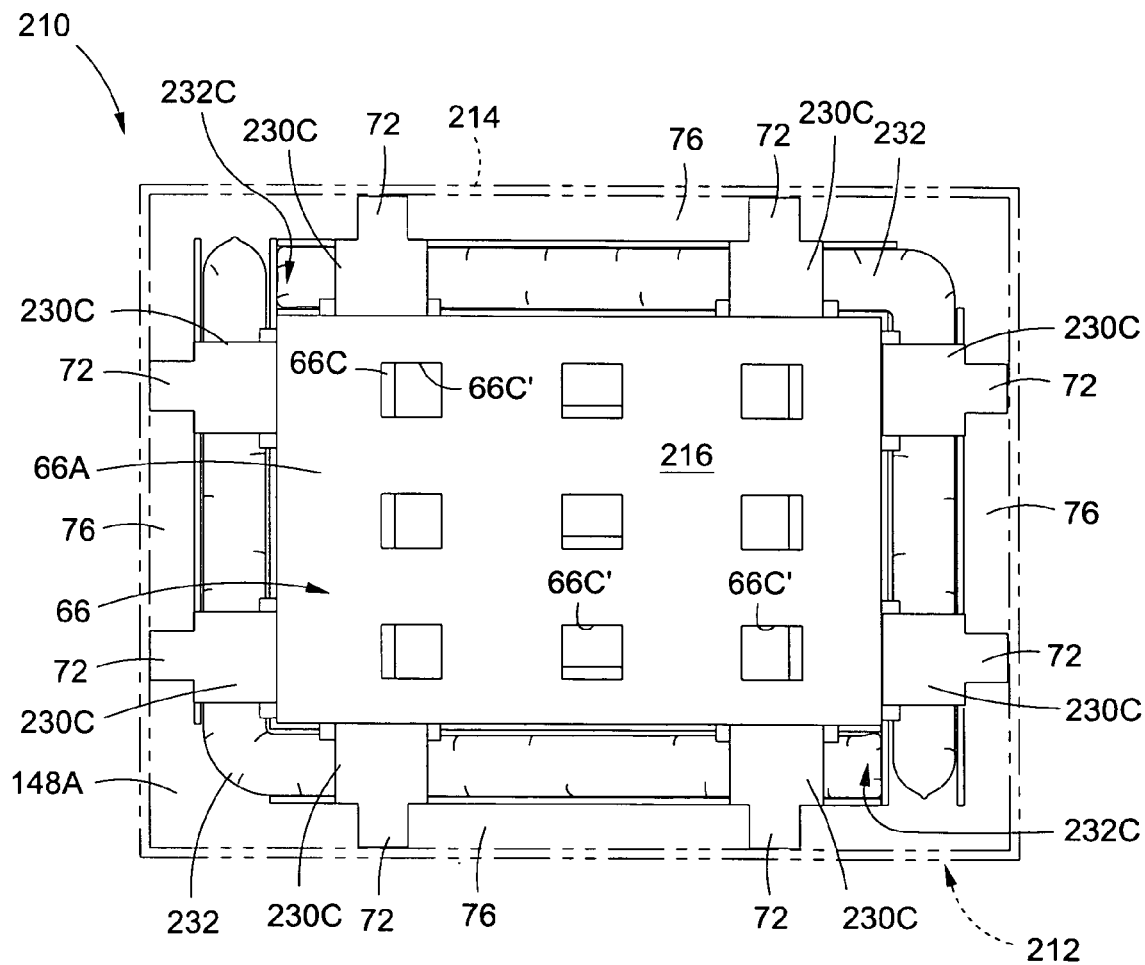
Figure 13:
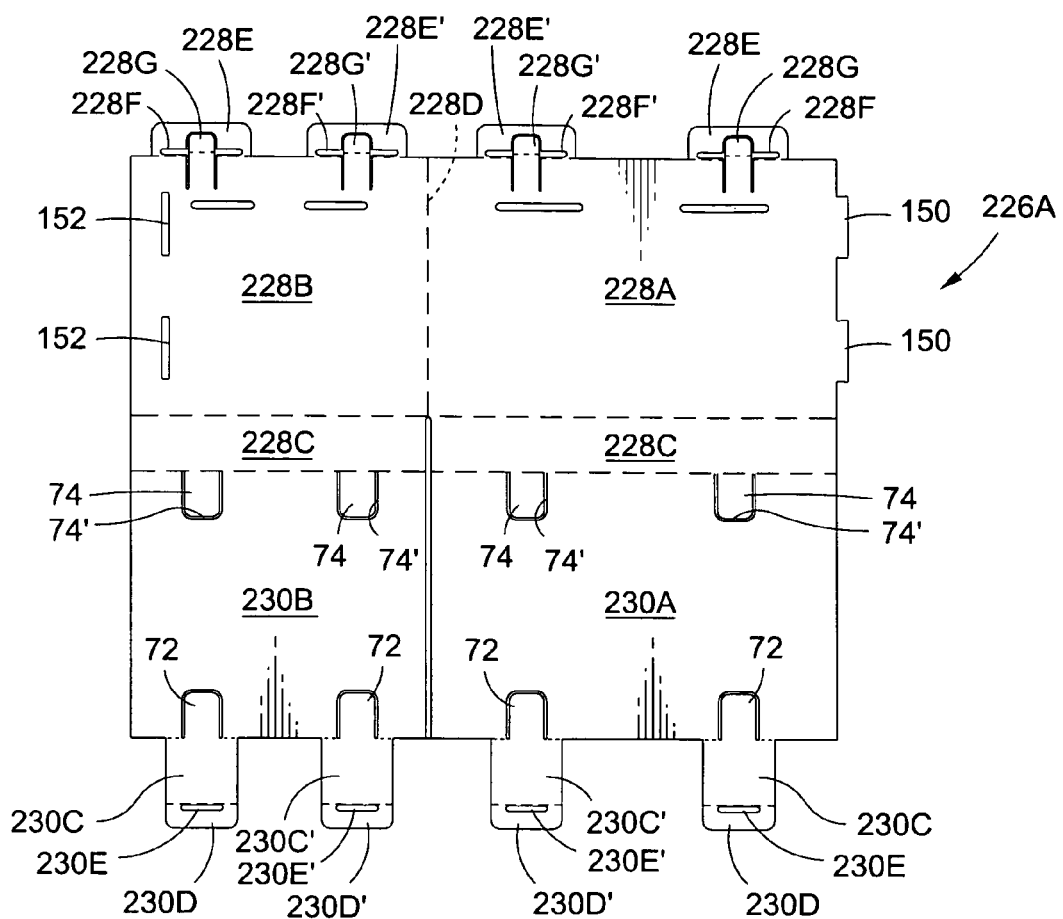
Figure 14:
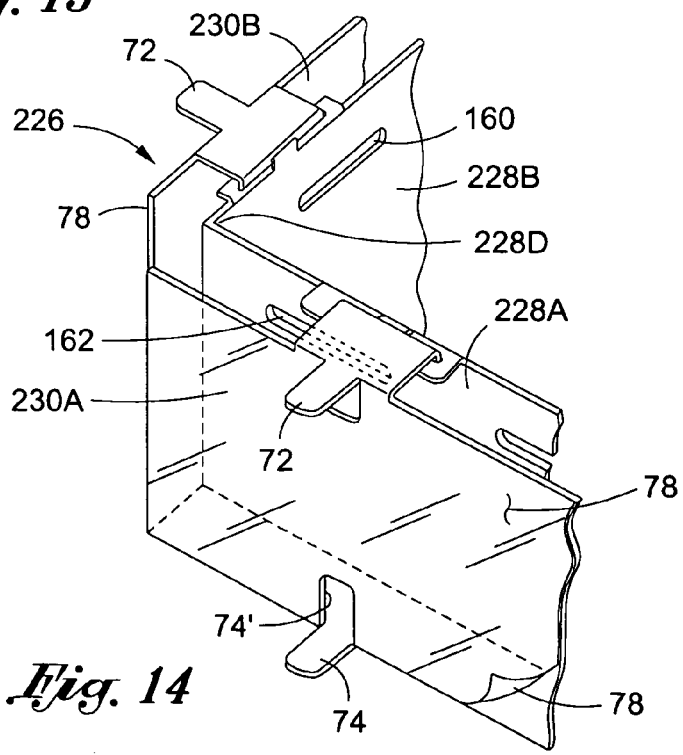
Figure 15:
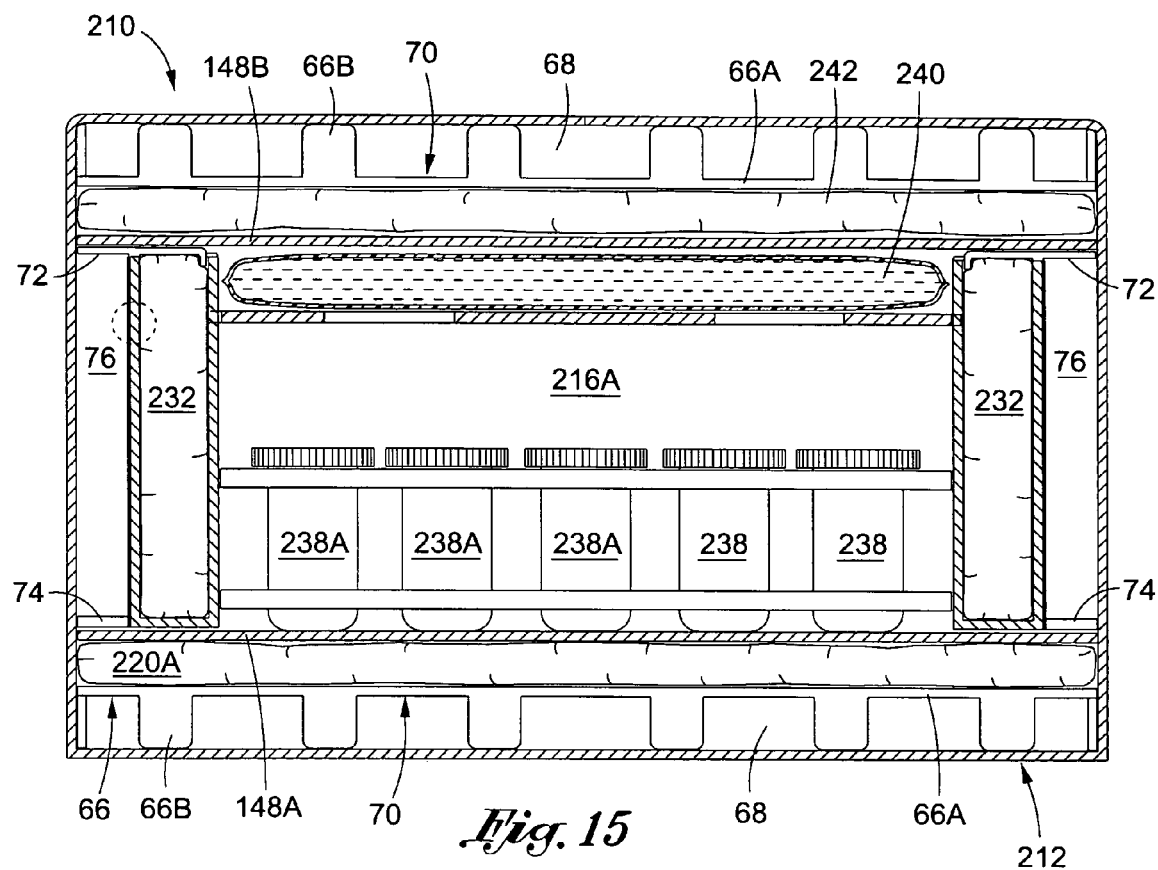
Figure 15A:
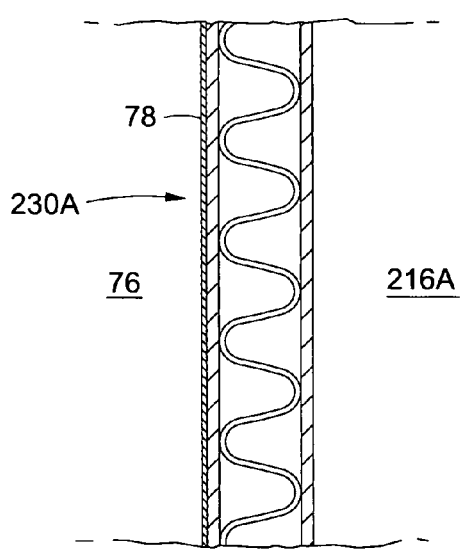

FIG. 7 provides an exploded perspective view of an alternative embodiment of an insulated shipping container according to the invention;

FIG. 8 is a plan views of a component part of the container seen in FIG. 7, and is seen at a first stage of manufacture before being placed into the configuration seen in FIG. 7;

FIG. 8A is a plan views of an optional component part of the container seen in FIG. 7;

FIG. 9 is a fragmentary perspective view illustrating how features of the component parts seen in FIGS. 7, 8, and 8A interconnect with one another;

FIG. 10 provides a perspective elevation view of the container seen in FIGS. 7-9, and is similar to the illustration of the first embodiment provided by FIG. 3;

FIG. 11 provides an exploded perspective view similar to that of FIGS. 1 and 7, but showing yet another alternative embodiment of an insulated shipping container according to the invention;

FIG. 12 is a plan view of a container as seen in FIG. 11;

FIG. 13 is a plan view of a component part of the container seen in FIGS. 11 and 12, and is seen at a first stage of manufacture before being placed into the configuration seen in FIGS. 11 and 12;

FIG. 14 provides a fragmentary perspective view of components and features of the embodiment seen in FIGS. 11-13;

FIG. 15 is an elevation view, partly in cross section, of a container as seen in FIGS. 11-14, and is shown packed and closed preparatory to shipping; and FIG. 15A provides an enlarged fragmentary cross sectional view of a component part used in the insulated shipping container of FIGS. 11-15.

Figure 16:
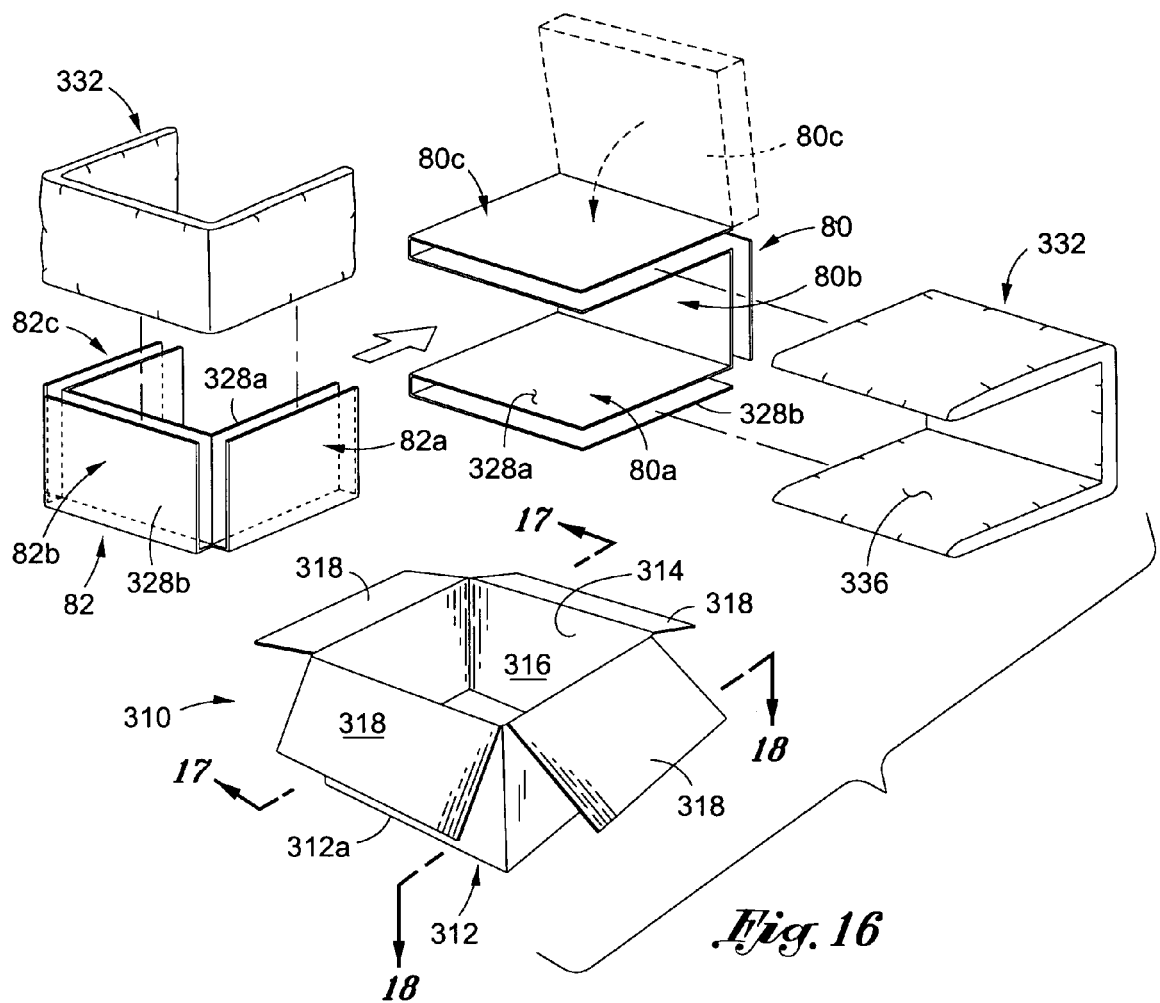
Figure 19:
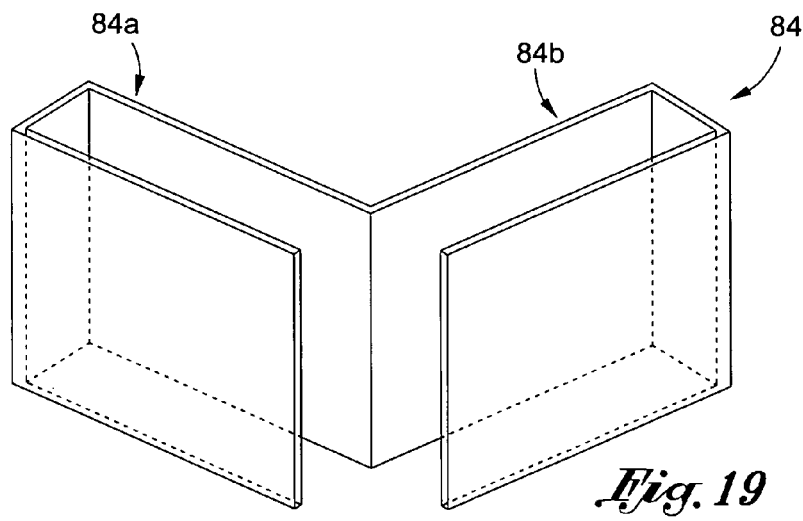
Figure 17:
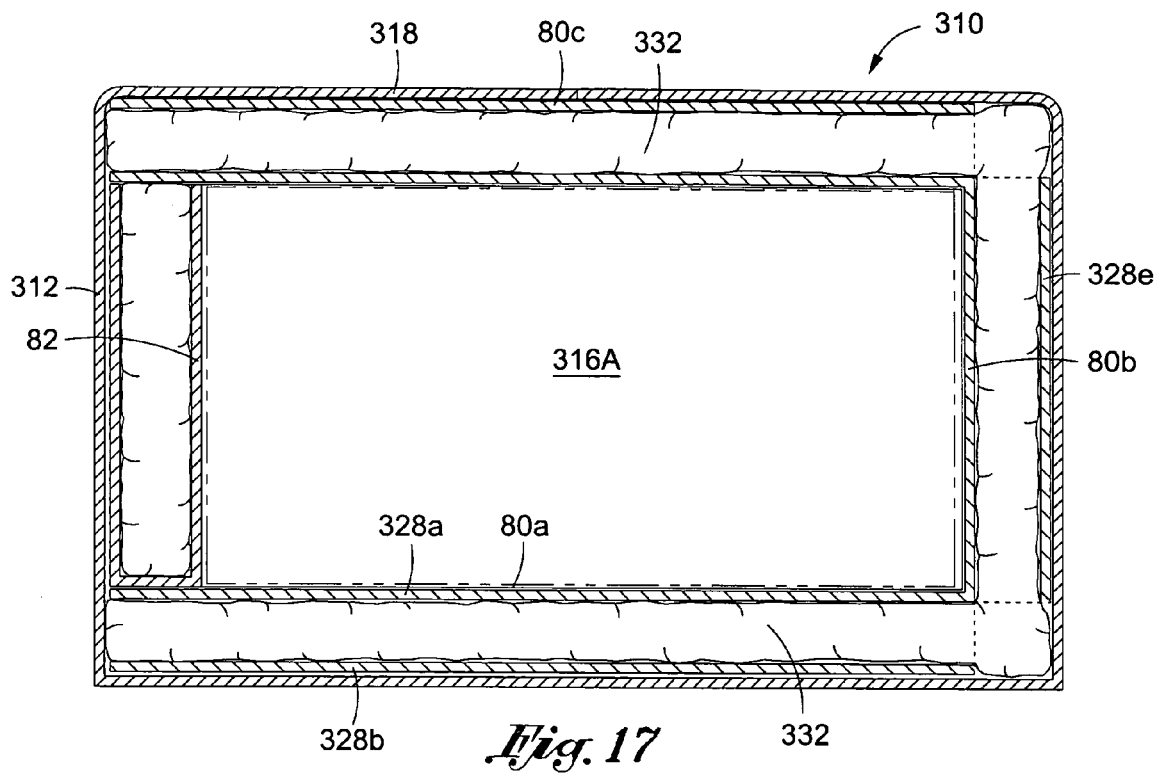
Figure 18:
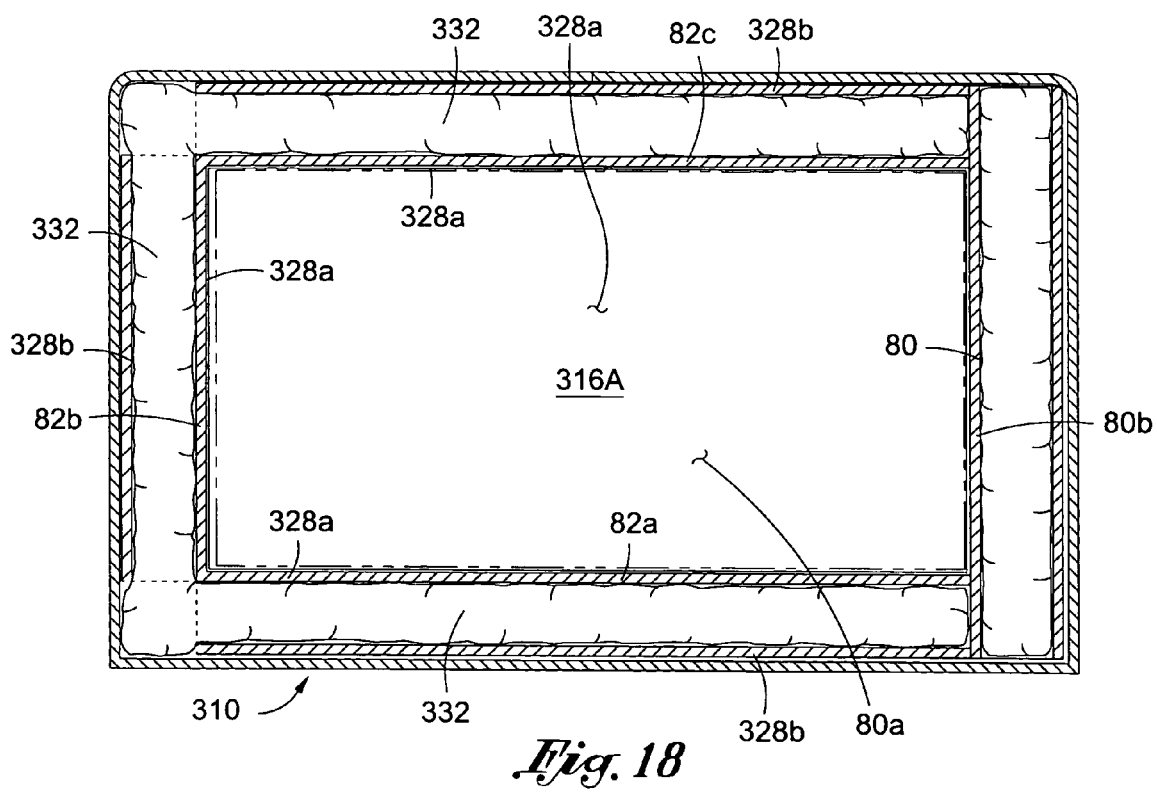
Figure 20:
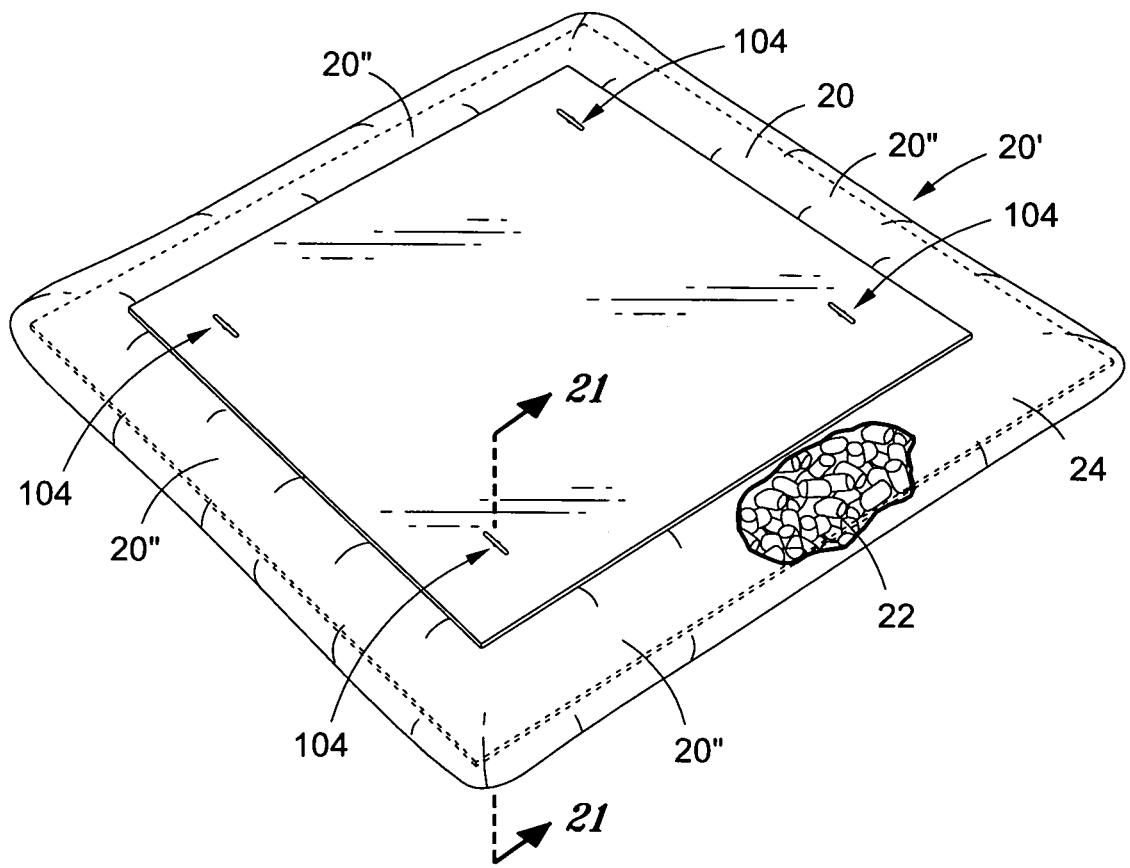
Figure 21:
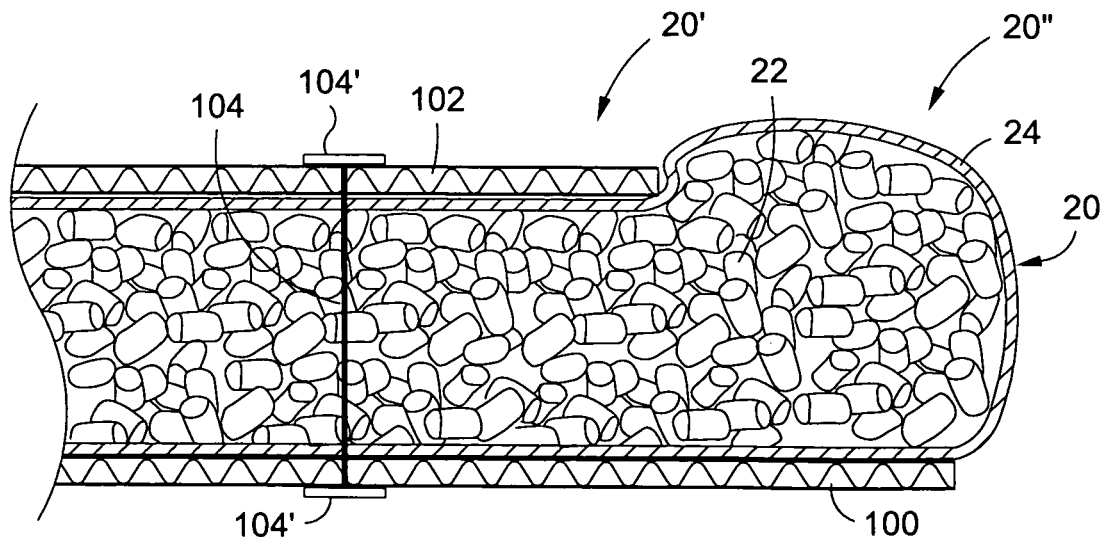

FIG. 16 provides an exploded perspective view similar to that of FIGS. 1, 7, and 11, but showing still another alternative embodiment of an insulated shipping container according to the invention;

FIGS. 17 and 18 are respective side elevation and plan views taken at the corresponding section lines illustrated in FIG. 16;

FIG. 19 provides a diagrammatic illustration of an alternative construction for a component part of an insulated shipping container according to the present invention; and FIGS. 20 and 21, respectively, provide a perspective view and a fragmentary cross sectional view of a wall member for use at the floor or ceiling of the cavity of a shipping container according to this invention.

DETAILED DESCRIPTION OF THE PREFERRED EMBODIMENTS

Turning now to the drawings, considering FIGS. 1-6 in conjunction, and giving attention first to FIG. 1, this Figure shows an exploded perspective view of an insulated shipping container 10 in accordance with the present invention. The container 10 generally includes an exterior cardboard (i.e., corrugated cardboard or paper board) shipping container or box 12, including plural side walls each indicated with the numeral 12a. These side walls cooperatively define an upper opening 14, leading to a rectangular prismatic cavity 16, and the opening 14 of which may be closed by plural flaps 18 integral with the box 12 (the bottom of the box 12 being closed by additional similar flaps, not seen in the drawing Figures, but which are conventional in the pertinent art).

Received first into the cavity 16 of box 12 is a layer of insulation material (generally indicated with the numeral 20a), which may be of the "loose fill" variety, or which may have the form of an insulating and cushioning pad or pillow 20. The insulation material in the pillow 20 consists of a quantity of particulate insulating pellets 22, loosely contained within a flexible and air-permeable outer casing 24. The pillow 20 has a size and shape congruent to the bottom or floor of the cavity 16, so that this pillow has a selected length, width, and resulting area. Most preferably, the insulating pellets 22 are formed of foamed or "puffed" vegetable starch. A most preferred material for making the insulating pellets 22 is corn starch. While the outer casing 24 may be made of a variety of materials, the most preferred material for making this casing is polyethylene sheeting, which has been needle punched to make it air permeable, and which is heat sealed to itself to form integral seams along its perimeter. Also, this polyethylene sheeting preferably has an ingredient added so that it biodegrades quickly.

So, the insulating and cushioning pillow 20 is breathable, and does not capture within it any particular volume of air. However, the pillow 20 does capture within it a certain volume or weight of the insulating pellets 22. As a result, when the insulating pellets are distributed substantially uniformly over the area of the pillow 20 (i.e., with the pellets loose, and with no compression being applied to the pellets 22), this pillow 20 has a determined thickness. Consequently, when the pillow 20 is placed into the bottom of cavity 16, the packing technician who is preparing box 10 for shipping distributes and spreads out uniformly the pellets 22 within the pillow 20 into a layer of substantially uniform thickness on the bottom of cavity 16. This layer of pellets or granular insulating material will have interstitial spaces among the pellets or granules, but will be substantially free of thin spots in the insulation, and especially will be free of voids or gaps extending through the insulating material from one side of the layer to the other. Alternatively, as has been mentioned, and as will be further explained, the insulating pellets 22 on the floor of cavity 16 may be placed loose in the bottom of this cavity (i.e., as "loose-fill" insulation), without the casing 24, and features of the container 10 will insure that the pellets 22 in this "loose-fill" condition also maintain a uniform insulating layer during transport of the box 10 without migration or the development of thin spots, gaps, or voids in this insulating layer.

Next received into the cavity 16 via the opening 14 is a pair of shock absorbing (or cushioning) and insulating inter-engaging channel members, each generally referenced with the numeral 26 (with a postscript "A" or "B" being added to distinguish the members from one another). The channel members 26A and 26B are formed of corrugated cardboard, like the box 12, and are substantially the same with the exception of features to be pointed out below. These members 26A and 26B differ in a small way (as will be further explained) so that they inter-engage to present a downwardly oriented circumferential retaining wall feature (referenced in each case with numeral 26C) at their bottom (i.e., toward the pellets 22 on the floor of cavity 16). When the two members 26 are placed into the cavity 16, the retaining wall features 26C are substantially circumferentially continuous about the perimeter of this cavity.

Viewing FIG. 1 in greater detail, and also viewing now FIGS. 2A and 2B, it is seen that each channel member 26 at an early stage of manufacture (i.e., in a flat condition prior to being formed into a U-shape or channel shape) includes a pair of inner walls, respectively indicated with reference numerals 28A and 28B, which are hinged to one another (i.e., via an integral scored and bendable connecting portion 28D of each), and form a 90° angle (or are L-shaped) relative to one another when installed into the cavity 16. It is to be noted that the present embodiment utilizes a rectangular prismatic exterior box only as an example. In fact, the exterior box, and/or its interior cavity can have other shapes. For example, the exterior container (i.e., exterior box) and/or its interior cavity, can have several sides (such as hexagonal, or octagonal, for example), and can be or approach circular in shape. In such cases, the channel members insulating and cushioning the side walls of the container would be individual to each side wall, or hinge into a shape which is generally conformal to the outer container side walls. Viewing FIGS. 1, 2A and 2B in conjunction, it is seen that the wall portions 26C extend horizontally from a lower extent of each of the walls 28A and 28B to carry upwardly extending outer wall portions 30A and 30B, respectively. When the members 26 are folded into the L-shaped configurations seen in FIG. 1, they each form (by cooperation of the walls 28A, 26C, and 30A; and 28B, 26C, and 30B, an upwardly opening channel shape, which is also L-shaped in plan view and U-shaped in end elevation view. It will be understood that individual channel members (which each are U-shaped in end view) may be employed, rather than an L-shaped combination channel member. Also, channel members which are elongate and have an upper and lower opening with a return wall at one end, and the opening of the channel shape at the other end can also be employed.

Also, it is seen in FIG. 1, and in FIGS. 2A and 2B, that the members 26A and 26B each include optional provision for securing the upper or distal edges of the wall portions 28A, 30A and 28B, 30B to one another in a determined spaced apart substantially parallel relationship. It will be understood that as these members are seen in FIG. 1 (i.e., without these optional features, the upper or distal edges of the wall portions may be mutually secured to one another in the desired spaced apart substantially parallel relationship preparatory to their being inserted into the cavity 16 by any number of expedients. For example, a length of adhesive tape of selected length may be spanned across the spaced apart distal edges of these walls. Returning to FIGS. 2A and 2B it is seen that in order to accomplish this securing of the walls 28A, 30A and 28B, 30B to one another, each wall 28A and 28B preferably includes a protruding hinged tab 28E defining a slot 28F. Spanning the slot 28F is a tab member 28G. On the other hand, each wall 30A and 30B includes a protruding hinged strap portion 30C terminating in a hinged tab 30D defining a slot 30E. Viewing FIG. 2C, it is seen how the strap portion 30C spans and spaces apart the walls 28 and 30 so that the tab part 30D is received into slot 28F. Then, tab member 28G is inserted into slot 30E, so that the strap portion spaces apart the walls 28 and 30 and the upper extent of each of these walls is interlocked with its mate, trapping an insulating cushion members 32 (i.e., cushion members 32A and 32B, further described below) therebetween with a mild compression, as will also be further explained.

As thus arranged, the members 26A and 26B may be prepared in advance of packing a box 10, complete with their insulating cushion members arranged in uniform layers between the opposed walls 28 and 30, and with the opposed walls maintained in a substantially parallel relationship placing mild compression on the insulating pellets 22 within the insulating pillows or cushions. Thus, the insulating pellets are arranged in a distributed continuous layer, free of insulation gaps or voids, and with the walls 28 and 30 applying mild compression to these pellets. Consequently, the pellets themselves interlock or inter-engage to maintain their uniform distribution free of gaps or voids in the insulating layer of pellets 22 during transport of the container 10.

Attention to FIGS. 2A and 2B, will also show that the members 26A and 26B are identically the same with the exception of the length of the wall portions 26C. In other words, member 26A has wall portions 26C which are the full length of the wall portions 30A and 30B (as is seen best in FIG. 2A), while member 26B has wall portions 26C which are shorter and are the length of wall portions 28A and 28B, viewing FIG. 2B. Consequently, when the members 26 are bent into an L-shape and are placed into the cavity 16, the longer wall portions 28C of member 26A cooperate with the shorter wall portions 28C of member 26B to inter-engage and so substantially complete and close the perimeter floor of the channel shape thus formed. When placed into the cavity 16, the members 26 cooperate to form a channel floor that is peripheral of this cavity, with the only openings about this perimeter being at the hinging attachment 28D of the wall portions 28A and 28B to one another. An important significance of this construction of the members 26 will be explained below.

Stated differently, in order to provide both cushioning and insulation at the members 26, each of these members 26A and 26B also includes one or a cooperating pair of insulating and cushioning members, or pillows, each referenced with the respective numerals 32A and 32B, which consists of a quantity of particulate insulating pellets 34 (i.e., substantially the same as the insulating pellets 22 within cushion 20), contained within an outer casing 36. In other words, the pillows 32 may be made sufficiently elongate that they bend into an L-shape within the wall members 26, or they may be made in pairs with each member of the pair being long enough to match one of the wall portions 30A or 30B. The casing 36 has a different shape but is otherwise the same as the casing 24 described above. As is best seen in FIG. 3, when the pair of channel members 26A and 26B are placed into the cavity 16 atop of the cushion 20, a product cavity or sub-cavity 16A is defined which is bounded downwardly by the cushion 20, and is bounded about its sides by the members 26A and 26B.

It is to be noted that whether the pillows 32 are made long enough to bend into an L-shape, or alternatively are made in pairs according to the length of the wall portions 30A, 30B, these pillow members 32 preferably have a length and a width slightly exceeding the length and width of the walls 26. In other words, the pillows 32 have a length at least about 5% or more longer than the length of the walls 26 which sandwich these pillow members. The pillows 32 also have a width at least about 5% or more wider (i.e., in the height direction of the container 10 as seen in FIG. 1) than the width of the walls 26 which sandwich these pillow members. Accordingly, as will be seen, when the walls 26 and sandwiched pillows 32 are placed into the cavity 16, the pillows are placed not only in facial compression across their thickness, but are also placed in circumferential compression about the perimeter of cavity 16/16A, as is further described and explained below. Further, when the walls 26 and sandwiched pillows 32 are placed into the cavity 16, and the container 10 is closed, the pillows 32 are placed into mild compression along their width (i.e., along the vertical direction of the container 10 as seen in FIG. 1. The result is that the pillows 32 interfere or forcefully engage with one another in order to inhibit respiration of air into and out of the cavity 16A during shaking and vibration of the container as happens during transport on a truck or aircraft, for example.

The cavity 16A is upwardly open, as seen in FIG. 3. Into this cavity 16A fits an optional product box 38 which is sized and configured to just fit the cavity 16A. The product box 38 carries one or plural products 38A (best seen in FIG. 5—and possibly carried in a spacer or tray which is not referenced in the drawing Figures) to be shipped to a destination within container 10, and in a temperature controlled environment. In cooperation with the members 26A and 26B, the bottom of this product box completes a barrier wall, which distributes weight and/or vertical compressive force across substantially the entire face of the cushion 20. Thus, insulating pellets within this cushion 20 are substantially prevented from migrating or shifting about during transit by a mild compressive force. As a result, the development of an insulation void (or voids) within the cushion 20 is prevented. Similarly, it is to be understood that as seen best in FIGS. 3 and 4, the spacing between walls 28A and 30A, and between walls 28B and 30B is also such as to apply a mild compressive force on the cushions 32A and 32B, respectively, (especially with the size and shape-matched product box 38 received into cavity 16A) thus also preventing the pellets of insulation within these cushions from migrating or shifting about during transit. As a result, the side walls of the container 10 are also prevented from developing a void (or voids) in the insulation of these side walls of the container 10. However, the product box 38 is optional, as will be seen in view of the description below of alternative embodiments of the present invention. Also, it will be apparent that the channel members 26A and 26B may rest upon the floor of the cavity 16, with the insulating pillow or cushion 20 being sized to fit within the sub-cavity 16A thus formed. In this case, the bottom of the product box itself will be effective to apply the desired mild compressive force to the layer of insulation material on the floor of the outer box 12.

Also viewing FIG. 3 particularly, it is seen that the pillows 32, because of their length which exceeds by about 5% or more the length of the walls sandwiching these pillow members, compressively engage with one another, as is indicated by the arrowed numerals 32C on FIG. 3. In other words, the pillows 32 are also placed into compressive stress along their length peripherally of the cavity 16/16A (See, arrowed numeral 32D on FIG. 3), and interfere with one another at their adjacent ends. This interference of the pillow members 32 with one another does not prevent their being placed into the cavity 16 because the pillows themselves being filled with loose insulation pellets 34 which are somewhat resilient, are likewise resilient and simply can be compressed circumferentially of the cavity 16 into their desired locations. However, it is to be appreciated that this interference of the pillows 32 with one another, and circumferential compression of the pillows 32 has at least two beneficial results. First, it mutually inter-engages and prevents relative shifting of the pellets 34 within the pillows 32 near the ends of these pillows. And secondly, the circumferential compression (recalling arrows 32D on FIG. 3) of the pillows 32 about cavity 16A causes them to sealingly engage with one another so as to inhibit respiration of air into and from the cavity 16A during the shaking and vibration of the container 10 which accompanies transit, as aboard a truck or aircraft, for example. So too, as is best seen in FIG. 3, the pillows 32 are wider than the walls 26, so that these pillow members stand proud of the sandwiching walls. As a result, when the container as seen in FIG. 1 is assembled and closed, the pillows 32 are additionally placed in mild compression across their width. A result of this facial, circumferential (i.e., lengthwise), and width-wise compression of the pillows 32 is that they forcefully engage one another or an abutting wall of the container 10, such as to inhibit respiration of air into and from the cavity 16A during transport of the container 10.

On top of the product box, the container 10 of FIG. 1 receives and includes a temperature control article, which may include a refrigerated gel pack or mass of dry ice, indicated generally with the numeral 40. Although the drawing FIG. 1 would suggest that article 40 is a gel pack, the invention is not so limited. In other words, dry ice in block, chuck, pellet, or flake form (or in any desired form) may also be used atop of product box 38 within cavity 16A.

Finally, on top of the product box 38, and on top of temperature control article 40, is received a top (or ceiling) insulating cushion, or pillow, referenced with the numeral 42, which may be substantially the same as pillow 20, and consists of a quantity of particulate insulating pellets 44 (i.e., substantially the same as the insulating pellets 22 and 34 within cushion 20 and cushions 32A, 32B), contained within an outer casing 46. It will be noted that the insulating cushion 42 is larger in plan view than product cavity 16A, and is substantially congruent in plan view with cavity 16. Thus, the insulating cushion 42 is captured between the upper extend of the walls 28A, 28B, 30A, 30B, and the temperature control article 40, all within cavity 16. By design, the thickness of insulating cushion 42 is such that when the flaps 18 of box 12 are closed (as is best seen in FIG. 5) at least the peripheral portion of this insulating cushion is also subject to a compressive force, thus also preventing the pellets of insulation within this insulating cushion 42 from migrating or shifting about during transit. As a result, the top wall also of the shipping container 10 is prevented from developing a void (or voids) in the insulation of this top wall during transit of the container 10. Optionally, as will be seen, a top wall of cardboard (not seen in this first embodiment, but illustrated in a subsequent embodiment) may be placed atop of the gel pack 40 and will thus support the top pillow 42 across its entire area. Accordingly, the entire area of top pillow 42 may be placed in mild compression, as will be better appreciated after consideration of the alternative embodiments. Additionally, the vertical compression applied by the closing of the top flaps provides compression on the bottom pillow 20.

In addition to the above, attention to FIG. 6 will further make clear that the insulating and cushioning pillows or cushions (i.e., 20, 32A, 32B, and 42) are each provided with a determined weight or volume of the insulating pellets 22, 34, 44, so that these insulating cushions have a determined or selected thickness when the insulating pellets (i.e., like pellets 22) are substantially uniformly distributed over the area of the respective casing of the pillow. Viewing FIG. 6, and using pillow 20 as an example, it is seen that the casing 24 has a certain area, as was explained earlier. Into this casing 24 is placed a certain weight or a certain volume of the insulating pellets 22, and the casing is sealed shut (most preferably by heat sealing a final seam of the plastic sheeting of the casing 24). So, at that point the casing simply has a mass of insulating pellets loose within it. But, in preparation for or during the packing of an insulated container 10, the packing technician lays the pillow 20 out flat and manually shuffles about the pellets within this pillow so that they form a substantially uniformly distributed layer free of voids. As is seen best in FIG. 6, the pillow 20 and distributed pellets 22 within this pillow will thus have a determined thickness dimension "T" substantially all across the area of this pillow 20. Subsequently, when the insulated container 10 is packed and readied for shipping, a mild compression (indicated by force arrows "F") in the direction of thickness "T" is applied to the pillow 20 (and to the pillows 32A, 32B, and 42). As a result of this mild compression the pillow 20 is compressed to a decreased thickness "t," and the pellets 22 are pressed against one another so that they slightly deform and interlock.

It will be understood that contrary to the common Styrofoam insulating pellets (i.e., foamed plastic pellets), the pellets 22 which are preferably made of corn starch or other vegetable starch do not have the same elasticity as plastic insulating pellets. Thus, the pellets 22 once they are interlocked with one another will tend to remain so interlocked provided that the applied mild compressive force is maintained. This mild compressive interlocking of the insulating pellets insures that a void (or voids) does not develop in the insulating layers of the container 10 during transit. Further, actual experience and testing with insulating pellets of the type described herein has shown that the best performance for a package as described is achieved when the puffed starch insulating pellets are cylindrical and from about ¼ inch to about ⅜ inch in diameter, with a length generally equal to their diameter. Of course when such insulating pellets are used together, they define interstitial spaces, and these interstitial spaces communicate with one another. However, the communicating interstitial spaces define only very tortuous communication pathways through a layer of such pellets, so there are no opening or voids, but a substantially trapped dead air space within a layer of such pellets. And, by interlocking or inter-engaging such pellets by the application of mild compression, the present invention substantially avoids the development of voids or gaps in an insulating layer of the puffed starch pellets. Also, although the illustrated insulating pellets of circular cylindrical shape are most preferred because of low manufacturing costs, other shapes may be used. For example, insulating pellets of triangular shape in cross section or of star shape in cross section (for example) may be employed. These alternative shapes may offer an advantage in that they are expected to more easily interlock with one another and to thus have improved resistance to migration during transit.

Turning now to drawing FIGS. 7-10, an alternative embodiment of the present inventive insulating and cushioning shipping container is presented. Because the embodiment of FIGS. 7-10 shares many features with the embodiment of FIGS. 1-6, features which are the same, or which are analogous in structure or function, are indicated on FIGS. 7-10 using the same numeral used above, and increased by one-hundred (100). Viewing FIGS. 7-10 in conjunction, and giving attention first FIG. 7, this Figure shows an exploded perspective view of an insulated shipping container 110 in accordance with the present invention. As with the container 10 of FIGS. 1-6, the container 110 includes an exterior cardboard shipping container or box 112, with plural side walls 112a, and an upper opening 114. The opening 114 leads to a rectangular prismatic cavity 116, and the opening 114 may be closed by plural flaps 118 integral with the box 112. In this case also, the bottom of the box 112 is closed by additional similar flaps, not seen in the drawing Figures, but which are conventional in the pertinent art. The closed lower flaps of the box 112 form a floor for the cavity 116.

Received in sequence into the cavity 116 is a layer of insulation material (generally indicated with the numeral 120a), which again may be of the "loose fill" variety, or which may be in the form of an insulating and cushioning pad or pillow 120. The pillow 120 consists of a quantity of particulate insulating pellets 122, contained within a flexible and air-permeable outer casing 124. The pillow 120 has a size and shape congruent to the bottom of the cavity 116, so that this pillow has a selected length, width, and resulting area. Most preferably, the insulating pellets 122 are formed of foamed or "puffed" vegetable starch, and a most preferred material for making the insulating pellets 122 is corn starch.

Next received into the cavity 116 atop of the layer of insulation material 120a is one of a pair of load distribution wall members generally indicated with the numeral 48, with the lower one of these members being indicated with numeral 48A. This wall member is preferably formed of corrugated cardboard, sized and shaped to be substantially congruent with the floor of cavity 116. Received into the cavity 116 atop of the wall member 48 is a pair of shock absorbing (or cushioning) and insulating inter-engaging L-shaped (i.e., in plan view) channel members, each generally referenced with the numeral 126, with the members being indicated with numerals 126A and 126B to distinguish them from one another. The channel members 126 are in this case the same as one another, and are formed of corrugated cardboard, like the box 12. However, as will be further explained, the channel members 126 inter-engage so as to assist in the maintaining of a mild compressive stress on insulating pillows 132 within these channel members, and also in order to assist one another in defining the sub-cavity or product cavity 116A.

As before, each channel member 126 includes a pair of inner walls 128A and 128B, which are hinged to one another (i.e., via an integral scored and bendable connecting portion 128D of each), and form a 90° angle relative to one another when installed into the cavity 116. These channel member 126 are also U-shaped in end elevation view. Viewing FIGS. 7, 8, 8A, and 9 in conjunction, it is seen that the wall portions 128A and 128B of each adjacent one of the pair of channel member 126 when received into the cavity 116, inter-engage with one another, and mutually support one another about the sub-cavity 116A, so that the side edges of the inner walls 128 are mutually supporting about sub-cavity 116. This mutual support and cooperation of the channel members 126 is accomplished by providing each side wall portion 128A with a pair of laterally extending tabs 50 (best seen in FIGS. 8 and 9), and providing each side wall portion 128B with a matching pair of slots 52. Thus, when the two L-shaped sets of channel members 126 are received into the cavity 116 (viewing FIG. 7), the adjacent side edges of the side wall portions 128A and 128B inter-engage with one another, and mutually support one another about the sub-cavity 116, by receipt of the tabs 50 into the closely matching slots 52 (viewing FIG. 9). It will be noted viewing FIG. 9 that the slots 52 are spaced from the adjacent side edge of the wall portion 128B such that the inter-engaging side wall portion 128A is supported in a substantially parallel relation to its opposite side wall portion 130A, and so that the insulating pillow (132) received between these side wall portions is maintained in mild compression on the insulating pellets within that pillow. Consequently, viewing FIG. 10, it is seen that the side edges of the inner walls 128 are mutually supporting about sub-cavity 116A, either with (or even without) the use of the optional straps and tabs (128E, 128F, 128G, 130C, 130D, and 130E) recalling the description of these features provided above. That is, the channel members 126 may (but don't necessarily have to) include the strap and tab structure as described in the first embodiment of FIGS. 1-6 for spacing apart and maintaining mild compressive stress on the cushioning and insulating pillows between these side wall portions. On the other hand, the tabs and straps acting across the upper distal edges, as well as inter-engagement of the side edge portions of the side walls 128A, 128B, may both be utilized together.

Again referring to FIG. 7, it is seen that in this embodiment in order to provide both cushioning and insulation at the channel members 126, each of these members 126A and 126B also includes an elongate insulating and cushioning member, or pillows, each referenced with the respective numerals 132, which consists of a quantity of particulate insulating pellets 134 (i.e., substantially the same as the insulating pellets 22 within cushion 20 as described above), contained within an outer casing 136. In this case, the pillows 132 are made sufficiently elongate that they bend into an L-shape within the wall members 126 as these wall members are hinged into their L-shape preparatory to being placed into the cavity 116. In this case, as the channel members 126 are prepared for use, the packing technician will lay out the pillow 132 on one of the walls 128 or 130 of the channel member 126 (i.e., in its flat shape generally as seen in FIG. 8) and uniformly distribute the insulating pellets within this pillow 132 preparatory to bending and securing the channel member 126 into its U-shape (i.e., U-shape in end or section view). Subsequently, the channel members 126 are hinged into their L-shape for insertion into cavity 116, as described above. The elongate pillows 132 also bend within the channel members 126 into the necessary L-shape as is seen in FIG. 7. As with the first embodiment of FIGS. 1-6, the embodiment of FIGS. 7-10 employs pillow members 132 which are about 5% too long (i.e., they exceed in length by about 5% the length of the walls sandwiching these pillow members 132). Accordingly, in the cavity 116, the pillows 132 compressively in interferingly engage with one another, or with an end-abutting wall, as is indicated by arrows 132C. The pillows 132 are also preferably about 5% wider than the sandwiching walls 126, so that the pillows 132 can contact one another or an adjacent wall in order to inhibit respiration in and out of the cavity 116A.

Next, the items to be shipped 138A are placed into the product cavity 116A (perhaps in a holder or tray, not referenced in the drawing Figures), followed by a perforate wall member 54. As is seen best in FIG. 8A, the wall member 54 consists of a sheet of corrugated cardboard 54A, which is sized and shaped to fit snugly into the product cavity 116A. This wall member 54 includes protruding tabs 56, 58 respectively on the sides and ends of this wall member, and these tabs are arranged to be supportingly received into corresponding slots 60, 62 defined respectively in walls 128A and 128B. Thus, the wall member 54 is supported above the product received into cavity 116A and this wall member 54 also assists in applying mild compressive force to the insulating pillows 132. That is, the wall member 54 by its size and shape-matching configuration to the cavity 116A assists in pushing outwardly on the walls 128A and 128B. Further, this wall member 54 defines plural slots or perforations 64, providing for communication of chilled air from a gel pack 140 disposed upon wall 54 into the product cavity 116A. As mentioned, the gel pack 140 or other temperature control material (i.e., such as dry ice, for example) is received into the space above and rests upon the wall member 54. Again, as will be easily understood, the perforate wall member 54 is supported by the walls 128A and 128B, and by its snug size and shape-matching engagement into the sub-cavity 116A, and with these wall portions 128 assists in supporting these wall portions so as to maintain and apply a mild compressive stress on the insulating cushions or pillows 132 in the channel members 126. It will also be apparent that a wall member like member 54 may be employed near the bottom of the sub-cavity 116A in order to provide a space for another refrigerated gel pack under the product. In such a case, the lower wall member like wall 54 would also assist in maintaining compression on the insulation adjacent to the side walls of the outer box 112. Still further, viewing FIG. 8, it is to be appreciated that the score line 28D can be partially slit in order to still allow connection of the adjacent parts of the channel member 126, while also contributing to a possibly improved distribution of compression stress on the insulation within these channel members 126.

Next, another load distribution wall member 48B, substantially the same as wall member 48A, sized and shaped to be substantially congruent with the floor of cavity 116, rests in the cavity 16 atop of the channel members 126. This wall member 48B confines the gel pack in the upper part of cavity 116A atop of perforate wall 54. The wall member 48B also supports across its entire facial area the insulating pillow 142 placed last into the cavity 116. Consequently, this insulating pillow by selection of the thickness of the various components fitted into cavity 116, is subjected to a mild compressive stress when the flaps 118 of the box 112 are closed and secured.

Now considering drawing FIGS. 11-15A, yet another alternative embodiment of the present inventive insulating and cushioning shipping container is presented. Because the embodiment of FIGS. 11-15A also shares many features with the embodiments of FIGS. 1-6, and 7-10, features which are the same, or which are analogous in structure or function, are indicated on FIGS. 11-15A using the same numeral used above, and increased by two-hundred (200). However, in contrast to the embodiments of FIGS. 1-6, and 7-10 which provided insulation by limitation of convection and conduction, this third embodiment provides in addition insulation by limitation of radiation. Accordingly, this third embodiment provides (as did the earlier embodiments, surrounding insulation which is held in mild compression to prevent migration and the development of insulation voids, and also adds a surrounding radiation barrier in combination with an air space. The air space also contributes to limitation of conductive heat flow toward the product cavity of the container.

Viewing FIGS. 11-15A in conjunction, and giving attention first FIG. 11, this Figure shows an exploded perspective view of an insulated shipping container 210 in accordance with the present invention. By way of introduction, the shipping container 210 is especially configured and constructed not only to insulate an item being shipped from ambient heat conveyed by conduction and convection, but also to largely block ambient heat delivered to the shipping container by radiation. Thus, this embodiment of shipping container is particularly useful in situations (which are common) in which a container in transit may sit exposed to the ambient mid-day sun, or to another source of radiant heat. For example, when a truck is traveling during the day, and a side wall of the truck is exposed to the sun, that side wall becomes very hot. Internally of the truck, this hot side wall may radiate a lot of heat to the packages carried in the truck. These situations frequently happens when containers in transit sit exposed to the sun on a shipping dock, or exposed to the sun in a shipping transfer yard, or are exposed to re-radiated heat within a container or truck trailer, for example. In such conditions, the ambient temperature may be within the insulating capability of the shipping container. However, the combination of ambient temperature and radiant heat load from the direct sun or from re-radiated heat may create a heat load above what the container can insulate against. Consequently, sensitive product is sometimes damaged or destroyed by such conditions.

As with the containers 10/110 of FIGS. 1-6 and FIGS. 7-11, the container 210 includes an exterior cardboard shipping container or box 212, with plural side walls 212a, and an upper opening 214. However, for a container with the same size of product cavity as the first two embodiments, the box 212 is externally larger, as will be explained. The opening 214 leads to a rectangular prismatic cavity 216, and the opening 214 may be closed by plural flaps 218 integral with the box 212. As before, the bottom of the box 212 is closed by additional similar flaps, not seen in the drawing Figures, but which are conventional in the pertinent art. The closed flaps form a floor for the cavity 216.

Received first into the cavity 216 is a radiation barrier and support wall member 66. This wall member 66 includes a wall part 66A formed of corrugated cardboard and defining plural peripheral support tabs 66B. These support tabs 66B are downwardly disposed as the wall 66A is received into cavity 216, and support the wall 66A away from the floor of the box 212. Additionally, the wall 66A includes plural die-cut windows 66C each generally of U-shape, which define respective downwardly depending support tabs 66C' (the corresponding upwardly extending tabs 66B and 66C' of a corresponding and substantially identical (but relatively inverted) upper support wall best being seen at the upper extent of FIG. 11). Consequently, the wall 66A is supported away from the floor of the cavity 216 to form an air space, indicated with the numeral 68 in FIG. 15. The air space 68 is disposed below the product cavity 216A. In order for the wall 66A to also serve as a radiation barrier, an outwardly disposed face of the wall 66A carries a radiation barrier, indicated with the numeral 70. This radiation barrier may comprise a thin layer of polished aluminum foil, for example. Alternatively, the radiation barrier may include a layer of plastic film that is provided with an aluminized layer (i.e., such as is commonly known as a "space blanket"). Most preferably, the radiation barrier is of such small mass that it does not prohibit recycling of the container 210. Alternatively, the radiation barrier may be only tenuously secured to the wall 66A, such that this layer may be stripped off and recycled separately from the remainder of the container 210. It will be understood that the radiation barrier need not be foil or even metallic. In other words, a high gloss reflective coating such as a laminate or even paint coating can be employed to form an effective radiation barrier.

Next received into the cavity 216 is a layer of insulation material (generally indicated with the numeral 220a), which in this case is preferably in the form of an insulating and cushioning pad or pillow 220, including a quantity of particulate insulating pellets 222, contained within a flexible and air-permeable outer casing 224. This insulating pillow structure will be familiar to the reader in view of the description above of the first two embodiments.

Next received into the cavity 216 atop of the layer of insulation material 220a is a load distribution wall member 148A, preferably formed of corrugated cardboard, sized and shaped to be substantially congruent with the floor of cavity 216. Received into the cavity 216 atop of the wall member 148 is a pair of shock absorbing (or cushioning) and insulating inter-engaging L-shaped channel members, each generally referenced with the numeral 226. The channel members 226 in this case also are the same as one another (as in the second embodiment described above), and are formed of corrugated cardboard. The channel members 226 inter-engage so as to maintain compressive stress on insulating pillows within these channel members, and also assist one another in defining the sub-cavity or product cavity 216A. The channel member 226 are U-shaped in end elevation or section view, and include a pair of inner walls 228A and 228B, which are hinged to one another (i.e., via an integral scored and bendable connecting portion 228D of each), and form a 90° angle relative to one another when installed into the cavity 216. As with the second embodiment described above, wall portions 228A and 228B of each adjacent one of the pair of channel members 226 when received into the cavity 216, inter-engage with one another, and mutually support one another about the sub-cavity 216A, so that the side edges of the inner walls 228 are mutually supporting about sub-cavity 216A. Again, this is accomplished by providing each side wall portion 228A with a pair of laterally extending tabs 150, and providing each side wall portion 228B with a matching pair of slots 152. Thus, when the two L-shaped sets of channel members 126 are received into the cavity 216 (viewing FIG. 11 and recalling the description of FIG. 9), the adjacent side edges of the side wall portions 228A and 228B inter-engage with one another, and mutually support one another about the sub-cavity 216A, by receipt of the tabs 150 into the closely matching slots 152 (viewing FIG. 9 again). Again, as was the case with the second embodiment also, it will be noted viewing FIG. 11 that the slots 152 are spaced from the adjacent side edge of the wall portion 228B such that the inter-engaging side wall portion 228A is supported in a substantially parallel relation to its opposite side wall portion 230A, and so that the insulating pillow 232 with portions 232A, 232B, received between these side wall portions is maintained in mild compression on the insulating pellets within that pillow.

Consequently, viewing FIG. 11, it is seen that the side edges of the inner walls 228 are mutually supporting about sub-cavity 216A, with or without the use of the interlocking straps and tabs, recalling the description of these features provided above. That is, the channel members 226 may, but don't necessarily have to, include the strap and tab structure as described in the first embodiment of FIGS. 1-6, and the second embodiment of FIGS. 7-10 for spacing apart and maintaining mild compressive stress on the cushioning and insulating pillows between these side wall portions. On the other hand, the tabs and straps acting across the upper distal edges, as well as inter-engagement of the side edge portions of the side walls 228A, 228B, may both be utilized together.

Particularly, viewing now FIGS. 11-14, it is seen that this particular embodiment preferably includes a duality of strap-and-tab structures interconnecting the upper or distal edges of the channel members. Viewing these drawing Figures, and particularly paying attention to FIG. 13, it is seen that a duality of strap and tab structures (now indicated with numerals, 228E and 228E', 228F and 228F', 228G and 228G', 230C and 230C', 230D and 230D', and 230E along with 230E' is provided in order to interconnect the opposite walls of the channel members 226. However, it is also seen that these portions of the channel members serve a dual purpose, as is explained below.

Giving now closer attention to FIGS. 11-14, it is seen that the wall portions 230A, and 230B of the channel members 226 include outwardly extending spacing tabs 72, 74, respectively disposed adjacent to the upper and lower margins of these wall portions. Viewing FIG. 13, it is seen that the tabs 72 are formed as extending sections of the wall portions 230A and 230B which are integral with the tabs 230C, 230C', and are bent 90° relative to the wall portion when the tab portions is bent in the opposite direction. It is to be noted viewing FIG. 12, that the pillows 232 forcefully engage and adjacent wall in order to inhibit respiration of air into and from the cavity 216A. That is, the pillows 232 are preferably about 5% longer and about 5% wider than the sandwiching walls of the container 210. It is to be further noted, that straps and tabs which are either wider or greater in number may be employed for greater strength, and to implement the desired degree of compressive stress upon the insulation material within the channel members. The integral construction of these spacing tabs 72 with the straps 230C and 230C' makes them much stronger and more positive in their positioning. On the other hand, the tabs 74 are formed by die cut windows 74' freeing the tab portion 74 on three sides, and allowing this tab portion 74 to be similarly bent 90° relative to the wall portion (viewing FIG. 14) as the floor portion 228C of the channel 226 is bent in the opposite direction. So, in each case, the spacing tabs are integral with a larger portion of the channel member 226 which is bent in the opposite direction from the spacing tab, and this integral construction makes the spacing tabs strong and stable. As is seen in FIG. 12, when the channel members 126 are installed into the cavity 216 of box 210, the tabs 72, 74 engage at their outer end surfaces on the inside of the box side wall 214, and create and air space 76 surrounding the sub-cavity 216A on all sides (i.e., in the horizontal or x, y directions). This air space is circumferentially continuous, and because the pillow 220 is air permeable, the air space 68 communicates with air space 76. The wall portions 230A and 230B each carry a radiation barrier 78, which is structurally or functionally equivalent to radiation barrier 70 (and is best seen in FIGS. 14 and 15A). In the illustration of FIG. 14, a small portion of the radiation barrier 78 is illustrate as though it has been slightly pealed away from the wall portion 230A for purposes only of illustration. However, this Figure does show how the radiation barrier 78 (and barrier 70) if tenuously attached to the cardboard wall portions, may be pealed off if necessary in order to allow the container 210 to be recycled.

Next, the items to be shipped are placed into the product cavity 216A, followed by a perforate wall member 154. The wall member 154 cooperates with the wall portions 228 in the same way described above with respect to the wall portion 54 of the second embodiment. A gel pack 240 is disposed upon wall 154 at the upper extent of the product cavity 216A. As mentioned, this gel pack 240 or other temperature control material (i.e., such as dry ice, for example) rests upon the wall member 154. As will be easily understood, the perforate wall member 154 by its engagement with the wall portions 228 assists in supporting these wall portions so as to maintain and apply a mild compressive stress on the insulating cushions 232 or pillows in the channel members 226.

Next, another load distribution wall member 148B, substantially the same as wall member 148A (i.e., sized and shaped to be substantially congruent with the floor of cavity 216) is placed into cavity 216. This wall member is the same as wall member 148A, but is relatively inverted, and it also rests in the cavity 216 atop of the channel members 226. This wall member 248B confines the gel pack in the upper part of cavity 216A atop of perforate wall 154, and also is disposed with its spacing tabs disposed upwardly, so as to create an air space (also referenced with numeral 68) best seen in FIG. 15, when the flaps 218 of the box 212 are closed and sealed shut preparatory to the insulated container 210 being shipped. Thus, the product sub-cavity of container 210 has an air space above and below the product cavity, with an outwardly disposed radiation barrier, and it also has an air space completely surrounding the product cavity in the horizontal direction, and also with an outwardly disposed radiation barrier. Inside of the radiation barrier, the product cavity is surrounded by insulation, which is maintained under a mild compression so that it does not migrate or develop insulation voids during transport of the container.

Turning now to drawing FIGS. 16-18, still another alternative embodiment of the present inventive insulating and cushioning shipping container is presented. Because the embodiment of FIGS. 16-18 also shares many features with the embodiment depicted and described earlier, features which are the same, or which are analogous in structure or function, are indicated on FIGS. 16-18 using the same numeral used above, and increased by three-hundred (300). Viewing FIGS. 16-18 in conjunction, and paying particular attention first to FIG. 16, it is seen that an insulated shipping container 310 in accordance with the present invention is shown in exploded perspective view. As with the container 10 of FIGS. 1-6, the container 310 includes an exterior cardboard shipping container or box 312, with plural side walls 312a, and an upper opening 314. The opening 314 leads to a rectangular prismatic cavity 316, and the opening 314 may be closed by plural flaps 318 integral with the box 312. In this case also, the bottom of the box 312 is closed by additional similar flaps, not seen in the drawing Figures, but which are conventional in the pertinent art. The closed lower flaps of the box 312 form a floor for the cavity 316.

Received in sequence into the cavity 316 is a first C-shaped channel or wall member 80. This wall member 80 is similar to the channel members 26 and 126 described above (i.e., being U-shaped in end or section view), but is of 3 hingeably connected sections, and includes a pair of spaced apart wall sections, like the earlier-described channel members. The channel member 80 differs in that it is oriented with a first section 80a, which is substantially congruent with the floor of 316 disposed horizontally on this floor of the cavity 316. A second section 80b of the channel member 80 is substantially congruent with and is disposed adjacent to one side wall of the box 312. This leaves the third section 80c of the channel member 80 to be hingeably movable between a first position in which it is generally upright (as is depicted by dashed lines in FIG. 16 (i.e., leaving open an entrance to a sub-cavity 316A) and a second position in which this section 80c is hinged down to the horizontal position seen in the drawing Figures. As will be seen, the channel member 80 and an additional inter-engaging channel member 82 each are preferably formed of corrugated cardboard, like the box 312. And, like the channel members depicted and described above, each section of these channel members 80 and 82 also include a pair of spaced apart walls 328A and 328B, cooperating to maintain a mild compressive stress on insulating pillows 332 captured between these juxtaposed walls. Further considering FIG. 16, it is seen that with the wall section 80c hinged upwardly, a second channel member 82 is received into the cavity 316, rests upon channel section 80a, inter-engages with the channel member 80, and cooperatively defines the sub-cavity 316A.

As before, each channel member 80 and 82 includes a pair of substantially parallel and spaced apart walls 328A and 328B, which are hinged to one another (i.e., via an integral scored and bendable connecting portion 328D of each), and form a C-shape when placed into the configuration seen in FIG. 16. These channel member 80, 82 are also U-shaped in end or section view. Referring to FIGS. 16, 17, and 18 in conjunction with one another, it is seen that also in this embodiment in order to provide both cushioning and insulation at the channel members 80, 82, each of these members also includes an elongate insulating and cushioning member, or pillow, each referenced with the respective numerals 332. While these pillow or cushion members are illustrated as being each of a single piece and elongate, the invention is not so limited. That is, each channel member 80, 82 may include a single cushion member as shown (which is also bent into a C-shape), or may include plural cushion members so that each cushion or insulating pillow is disposed in a respective section of the channel members 80, 82. Preferably, the cushion members 332 consist of a quantity of insulating pellets (i.e., substantially the same as the insulating pellets 22 within cushion 20 as described above), captively received or confined within an outer casing 336. In this case, the pillows 332 are preferably made sufficiently elongate that they bend into a C-shape within the channel members 80, 82 as these channel members are hinged into their C-shape preparatory to being placed into the cavity 316. These pillow members 332 are also about 5% longer then their sandwiching walls so that a peripheral or circumferential compression, in addition to facial compression, is achieved on these pillow members 332.

Viewing FIGS. 16, 17, and 18 in conjunction, it is seen that the pair of channel members 80, 82 when received into the cavity 316, inter-engage with one another, and mutually support one another about the sub-cavity 316A. The channel member 82 (like channel member 80) also includes a first section 82a, which lies adjacent to a side wall of the box 312, while a second section 82b of the channel member 82 is adjacent to another side wall of the box 312 (i.e., opposite to channel section 80b). This leaves the third section 82c of the channel member 82 adjacent to the remaining side wall of the box 312. As was explained above, the mild compressive force applied to the cushions 332 may be accomplished at least in part in preparation for the insertion of the channel members 80, 82 into the cavity 316 by use of a length of tape spanning the distal edges of the channel members 80, 82. Alternatively, this cooperation of the channel member walls can be accomplished using the strap and tab structures as described in the first embodiment of FIGS. 1-6 for spacing apart and maintaining mild compressive stress on the cushioning and insulating pillows between the side walls of the channel members.

Turning now to FIG. 19, another alternative embodiment of a channel member 84 alone is illustrated. FIG. 19 illustrates that a channel member 84 according to this invention may be constructed with the U-shape of the channel running or extending perpendicular to the length of the channel member. That is, by way of comparison, viewing FIGS. 1-6, it is seen that the U-shape of the channel members 26 extends parallel with the length of the channel members themselves. In contrast, the channel member construction illustrated in FIG. 19 shows that the advantages of this invention may be achieved using a channel member 84 with two respective U-shape channels 84a and 84b, which extend perpendicular to the length of the channel member 84, and results in a uniquely simple and inexpensive construction for this channel member.

Turning now to FIGS. 20 and 21, a variation in the insulating pillows 20 (and 42) seen in FIGS. 1-6 is illustrated. It will be recalled that the pillows 20 and 42 of FIGS. 1-6 are essentially the same, with one (pillow 20) being used at the floor of cavity 16A, and the other (pillow 42) being used at the ceiling of this cavity. In the embodiment of FIGS. 20 and 21, an alternative insulated wall structure including such a pillow 20 is indicated with numeral 20'. In this orientation, the wall structure 20' would be used as a "floor" relative to cavity 16A, while it would also be used in an inverted orientation as a "ceiling" above the cavity 16A. Viewing FIGS. 20 and 21, it is seen that the insulated wall structure 20' includes a pillow 20 as depicted and described above, but now the pillow 20 is sandwiched in facial compression between a cardboard base wall 100 (i.e., adjacent the box 12) and a cardboard facing wall 102 (i.e., bounding or disposed toward cavity 16A). The base wall 100 is larger then the facing wall 102, so that a peripheral free or uncompressed "puffy" portion 20" of the pillow 20 appears about the perimeter of facing wall 102. As before, the pillow 20 is loose filled with insulating pellets 22 and includes a casing 24. In order to hold the walls 100 and 102 in mild facial compression sandwiching the pillow 20, a number of fasteners 104 are utilized. These fasteners 104 are of a single piece, and consist of an elongate string-like part connecting a pair of cross-bar heads 104'. The heads 104' engage the walls 100, 102 and the central string-like part of the fasteners 104 are placed in tension, thus maintaining the walls 100, 102 in mild sandwiching facial compression on the pillow 20. The insulating wall structure 20' has the advantage that the puffy portion 20", when the walls 26 are placed into cavity 16, forms a gasket or seal inhibiting respiration into and from the cavity 16A, much as was the case with the extra length portions of the pillows 32 interfering with one another in circumferential compression about this cavity 16A.

In view of the above, it will be appreciated that, although the invention is not so limited, actual embodiments of this present inventive shipping container have been tested with cylindrical insulating pellets made substantially of foamed or "puffed" corn starch. These insulating pellets may vary somewhat in size, and preferably are generally from about ⅜ inch to about ⅝ inch in diameter and are about the same length as their diameter. However, other sizes of insulating pellets, granules, or prills (i.e., small pellets) may be utilized. It is to be noted, and is further explained below, that insulation pellets having shapes other than circular cylindrical pellets may be employed. For example, triangular or star shapes in cross section might be used, and the pellets may be curved to provide a greater surface area for their subsequent interlocking when placed under compressive stress. Further, the insulating cushions or pillows which are formed by confining such insulating pellets, prills, or granules in a casing my be long enough to insulate more than one adjacent wall, ceiling, or floor section of the package, or they may be only large enough to insulate a single wall or section of such a wall. Testing of inventive shipping containers have shown that in order to prevent migration of the puffed corn starch cylindrical insulating pellets, a compression of about 10% of the thickness of an insulating cushion (or mass of loose-filled insulating pellets) with respect to their loose or uncompressed thickness is desired. This degree of compression is such as to effect an "interlocking" of the puffed corn starch insulating pellets, thus preventing their migration, and preventing the formation of an insulation void during transit. On the other hand, this most preferred degree of compression of the puffed corn starch insulation pellets is not such that the pellets are crushed, or that their insulation value (i.e., R rating) is adversely affected.

In view of the above, it is understood that the insulated shipping container herein disclosed defines an ullage volume between inner and outer boxes, with the ullage volume including a pair of spaces on opposite sides of a product box and extending in an "x" direction, a pair of spaces on opposite sides of the product box and extending in a "y" direction, and a pair of spaces respectively one above and one below the product box and each extending in a "z" direction. The product box receives and carries therein an item to be shipped, with a mass of temperature control material (i.e., a refrigerated gel pack or a mass of dry ice, for example) providing cooling to the product item during shipping. The ullage volume is filled with a substantially uniformly distributed or arranged granular or pellet insulating material, And, facilities are provided to apply a mild compressive stress and strain to this insulating material, thus preventing it from shifting about, migrating, or developing voids or gaps in the insulation during transit of the shipping container. An alternative embodiment of the invention provides for the product cavity to also be substantially surrounded by an outwardly disposed radiation barrier, and this radiation barrier is associated with an air space cutting off conductive heat transmission into the product cavity.

While the invention is susceptible to various modifications, and alternative forms, a specific example thereof has been shown in the drawings and is herein described in detail. It should be understood, however, that the invention is not to be limited to the particular forms disclosed, but to the contrary, the invention is to cover all modifications, equivalents and alternatives falling within the spirit and scope of the appended claims. For example, it is apparent that the insulating pellets used in the shipping container could in-part, or could entirely, be of the loose-fill variety. That is, insulating cushions or pillows as depicted and described above need not be used, or can be used only in selected locations of the shipping container according to this invention. Also, it will be apparent that instead of a bottom layer of insulation with individual or L-shaped channel members along the sides, and a top layer of insulation; an alternative configuration is to provide to inter-engaging C-shaped channel members each carrying a layer of insulation. In this configuration, one of the C-shaped channel members provides insulation to the floor, to one sidewall, and to the top of a product cavity. And, the other C-shaped channel member inter-engages with the first channel member and provides insulation to the other three sidewalls of the product cavity. Also, it is apparent that in instances in which the contents and/or gel pack of a shipping container of the third embodiment (i.e., FIGS. 11-15A) is sufficiently heavy, then reinforced spacing tabs 66B, 66C, 72, 74 may be required, or these spacing tabs may need to be replaced or supplemented with a more robust spacing structure. One way in which the spacing tabs could be made more robust is to make them L-shaped or U-shaped (for example) in end view, so that the additional leg(s) of the L-shape or U-shape helps stiffen and stabilize the main portion of each spacing tab. Also, as was mentioned above, a bottom wall member or tray as shown in FIG. 8A may be utilized to provide additional compressive pressure against the surrounding channel members, and to thus assist in maintaining compressive interlocking of the insulation in these channel members. Such a bottom wall member would also provide a space into which additional refrigerated gel pack(s) could be disposed in order to cool the shipped item(s) during transit. As a final comment, it is to be noted that a cohesive or adhesive coating can be applied on the insulation material granules/pellets, either in lieu of or in combination with mechanical compressive pressure, all with the purpose of maintaining the insulation material immovable during shipping of the container. In addition, Applicant has discovered that with the insulating pellets being made of foamed corn starch, then a light misting of these insulating pellets with ordinary water before they are placed into the container will result in the pellets becoming cohesive. Thus, the cohesive pellets will adhere to one another in an insulating mass in the container, and will resist migration or shifting of the pellets during transit of the container. This has an advantage of also contributing to a uniform selected "R" value for the insulated container. Finally, it should be apparent to those ordinarily skilled in the pertinent arts that individual wall members as seen in FIGS. 20 and 21 could be utilized at each of the six sides of a product cavity within a shipping box as seen at 12 in FIG. 1. In that case, the protruding portions of the pillows 20 would engage one another, and provide compression of the pellet/granular insulating material in the pillows, so that the insulation material does not shift about during transit. Also, the engagement of the adjacent pillows one with another inhibits respiration of air into and from the product cavity within the box 12.

I claim:

1. An improved insulated and cushioning shipping container, said shipping container comprising:
   an exterior cardboard box defining a floor wall, and plural side walls, said walls cooperatively defining a cavity and an opening to said cavity, and means for closing said opening;
   wall structure within said cavity and defining a product cavity;
   a mass of insulating material of pellet/granular form received and distributed substantially about said product cavity between said wall structure and said exterior cardboard box; and
   said wall structure being configured for applying a compressive stress and strain to said insulating material in at least one of three mutually orthogonal horizontal "x", "y", and "z" directions, so that said pellets/granules of insulating material mutually engage and interlock with one another, whereby said insulating material is inhibited from migration during shipping of said container;
   wherein a portion of said insulating material is disposed in an insulating and cushioning pad member disposed within said wall structure, whereby said insulating and cushioning pad is subjected to compressive stress and strain within said wall structure to effectively compressively interlock said insulating material against migration of said pellet/granular insulating material during transit of said shipping container.

2. The insulated shipping container of claim 1 wherein said pad member defines a length dimension and a width dimension cooperatively defining a face size for said pad member, and said pad member further defining a thickness dimension, and said compressive stress is applied facially across the thickness of said pad member.

3. The insulated shipping container of claim 2 wherein two portions of said insulating material are disposed in respective ones of a pair of insulating and cushioning pad members, and said wall structure applies compressive stress to each of said pair of pad members to interlock the insulating material against migration during transit, and said wall structure defines a length dimension, said pair of pad members exceeding said length dimension by a selected amount such that said pair of pad members interfere resiliently with one another to place said pair of pad members and the insulating material therein also into compressive stress in a second of said "x", "y", and "z" directions along one of the length and width of said pad members.

4. The insulated shipping container of claim 3 wherein said wall structure further applies a compressive stress to said pair of pad members in the other of said length and width directions so that said insulating material of pellet/granular form is subject to compressive stress in each of said "x", "y", and "z" directions, and said product cavity remains free of insulating material therein.

5. The insulated shipping container of claim 3 wherein three portions of said insulating material are disposed in respective ones of three insulating and cushioning pad members, and said wall structure applies compressive stress to each of said three pad members to interlock the insulating material therein against migration during transit, and said wall structure defines both a length dimension and a width dimension, two of said three pad members exceeding said length dimension by a selected amount such that said two pad members contact and interfere resiliently with one another to place said two pad members and the insulating material therein into compressive stress in a second of said "x", "y", and "z" directions along said length dimension, and said third pad member contacting and interfering resiliently with said two pad members to place said two pad members into compressive stress along a third of said "x", "y", and "z" directions.

6. A method of providing an improved insulating and cushioning shipping container, said method comprising steps of:
   providing an exterior box defining a floor wall and plural side walls cooperatively defining a cavity there within, and an opening to said cavity, and means for closing said opening;
   providing a plurality of insulating and cushioning pillow members;
   providing said plurality of pillow members each with an air permeable flexible casing having a length and width cooperatively defining a facial size for each pillow member, and a thickness, and within each of said plurality of pillow members providing a respective mass of insulating material of pellet/granular form;
   providing a wall structure including respective pairs of cooperating walls, each pair of cooperating walls receiving a respective one of said plurality of pillow members therebetween in facial contact, and utilizing said pairs of cooperating walls to applying a selected facial compressive stress and strain to said insulating material within said plurality of pillow members; and
   employing said selected compressive stress and strain to mutually interlock the mass of insulating material of pellet/granular form within said plurality of pillow members so as to inhibited migration of said insulating material during transit of said shipping container.

7. The method of claim 6 further including the step of configuring said respective pillow members so that each exceeds by a selected amount at least one of the length and width dimensions of said pair of cooperating wall receiving said respective pillow member therebetween.

8. The method of claim 7 wherein the excess in length or width of each pillow member is utilized to form a protruding portion of the respective pillow member, and the protruding portions of adjacent pillow members are forcefully engaged resiliently with one another in order to inhibit respiration of air into and out of said product cavity.

9. An improved insulating and cushioning shipping container, said container comprising:
   an exterior box defining a floor wall and plural side walls cooperatively defining a cavity there within, and an opening to said cavity, and means for closing said opening;
   a plurality of insulating and cushioning pillow members received into said cavity adjacent ones of said floor wall, said plural side walls, and adjacent to said means for closing said opening, said plural insulating and cushioning pillow members cooperatively defining a product sub-cavity within said cavity;
   each of said plurality of insulating and cushioning pillow members including an air permeable flexible casing having a length and width cooperatively defining a facial size for each respective pillow member, and a thickness, and
   within said cavity and about said product sub-cavity, a wall structure including respective pairs of cooperating walls, each pair of cooperating walls receiving a respective one of said plurality of pillow members therebetween in facial contact, and means for urging said pairs of walls toward one another sandwiching and capturing the respective one of said plural pillow members therebetween in facial compressive stress applied to said insulating material of pellet/granular form within said pillow members, whereby said insulating material is interlocked against movement, and
   each of said plurality of pillow members being configured to exceed by a selected amount at least one of the length and width dimensions of said pair of cooperating wall members receiving and sandwiching said respective pillow member therebetween;
   whereby adjacent ones of said plurality of pillow members forcefully engaged resiliently with one another in order to inhibit respiration of air into and out of said product cavity.

* * * * *